United States Patent
Nizar et al.

(10) Patent No.: US 12,360,808 B2
(45) Date of Patent: *Jul. 15, 2025

(54) SELECTING A NODE OF A WORK GROUP FOR EXECUTING A TARGET TRANSACTION OF ANOTHER WORK GROUP TO EXECUTE SKIPPABLE STEPS PRIOR TO A PREDICTED INTERRUPTION

(71) Applicant: Oracle International Corporation, Redwood Shores, CA (US)

(72) Inventors: Naveen Jafer Nizar, Chennai (IN); Kyasaram Vishwa Prasad, Hyderabad (IN); Guru Selvaraj, Hyderabad (IN); Srinivasan Sankaranarayanan, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 921 days.

This patent is subject to a terminal disclaimer.

(21) Appl. No.: 17/304,711

(22) Filed: Jun. 24, 2021

(65) Prior Publication Data

US 2022/0413920 A1    Dec. 29, 2022

(51) Int. Cl.
    *G06F 9/50*    (2006.01)
(52) U.S. Cl.
    CPC ................. *G06F 9/5027* (2013.01)
(58) Field of Classification Search
    None
    See application file for complete search history.

(56) References Cited

U.S. PATENT DOCUMENTS

| | | | | |
|---|---|---|---|---|
| 10,514,951 B2 * | 12/2019 | Bahramshahry | ...... | G06F 9/5038 |
| 10,540,202 B1 * | 1/2020 | Smaldone | ............ | G06F 9/5027 |
| 10,996,984 B1 * | 5/2021 | Jonsson | ................ | G06F 9/5066 |
| 2015/0154056 A1 * | 6/2015 | Chen | ...................... | G06F 9/4856 |
| | | | | 718/103 |
| 2016/0299795 A1 * | 10/2016 | Kagami | ................ | G06F 9/5027 |
| 2018/0217901 A1 * | 8/2018 | Fujii | ................... | G06F 11/1474 |
| 2020/0159587 A1 * | 5/2020 | Li | .......................... | G06F 9/4881 |
| 2020/0301741 A1 * | 9/2020 | Gabrielson | ........... | G06F 9/5038 |
| 2022/0129322 A1 * | 4/2022 | Schwartz | ............. | G06F 9/5038 |
| 2022/0138015 A1 * | 5/2022 | Verma | .................... | H04L 67/10 |
| | | | | 709/226 |

* cited by examiner

*Primary Examiner* — Bradley A Teets
*Assistant Examiner* — Melissa A Headly
(74) *Attorney, Agent, or Firm* — Invoke

(57) ABSTRACT

A computing network includes nodes of different work groups. Nodes of a work group are dedicated to transactions of the work group. If a node of a first work group is predicted to have an idleness window, a second work group may borrow the node to execute a transaction of the second work group. At least a subset of steps of the transaction may be categorized into a step group. Trees of a transaction may be categorized into one or more tree groups. A node is selected for executing a transaction, if the predicted idleness duration of the node is sufficient relative to the predicted runtime of the transaction, the step group, and/or tree group. A credit system is maintained. A first work group transfers a credit to a second work group when borrowing a node of the second work group for executing a transaction of the first work group.

16 Claims, 19 Drawing Sheets

SELECTING A NODE OF A WORK GROUP FOR EXECUTING A TARGET TRANSACTION OF ANOTHER WORK GROUP TO EXECUTE SKIPPABLE STEPS PRIOR TO A PREDICTED INTERRUPTION

RELATED APPLICATIONS; INCORPORATION BY REFERENCE

This application is related to U.S. Non-Provisional patent application Ser. No. 17/304,706 titled: "Selecting a Node Dedicated to Transactions of a Particular Work Group for Executing a Target Transaction of Another Work Group", filed on Jun. 24, 2021 and U.S. Non-Provisional patent application Ser. No. 17/304,709 titled: "Selecting a Node Group of a Work Group for Executing a Target Transaction of Another Work Group to Execute Skippable Steps Prior to a Predicted Interruption", filed on Jun. 24, 2021, which is hereby incorporated by reference.

The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to selecting a node in a computing network for executing a transaction. In particular, the present disclosure relates to selecting a node dedicated to transactions of a particular work group for executing a target transaction of another work group.

BACKGROUND

Different network resources of a computing network may be dedicated to or responsible for executing transactions of different work groups. A transaction may include, for example, a set of steps to be performed for a continuous integration/continuous deployment (CICD) pipeline process. The grouping of transactions may be based on various attributes of the transactions. As an example, transactions originating from different types of clients may be categorized into different work groups. A network resource dedicated to transactions of a particular work group may be referred to as belonging to the particular work group. A network resource serving a transaction of a particular work group may be referred to as being "used by" the particular work group.

Workloads of work groups within an entity (such as a company) may fluctuate over time, and may at times exceed the capacity of the network resources of the respective work groups. The level of network resources of a particular work group may be increased to address the workload spike of the particular work group. Where the company purchases network resources from a network service provider, an increase in resource level may result in increased cost to the company.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1A:
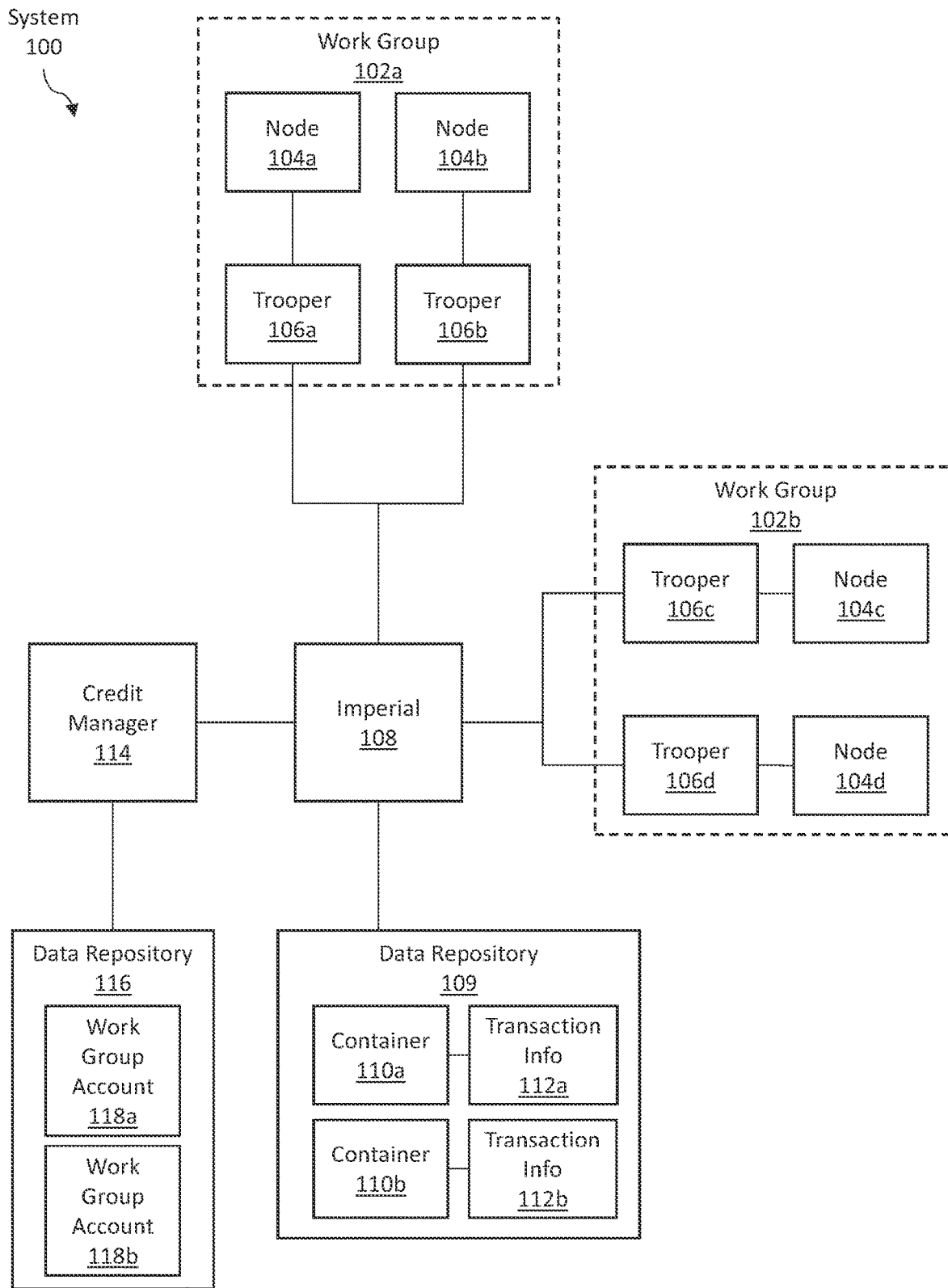
FIGS. 1A-1B illustrate a non-dedicated node selection system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. NON-DEDICATED NODE SELECTION SYSTEM ARCHITECTURE
3. IDLENESS PREDICTIONS
4. PARALLEL EXECUTION INFORMATION AND DEPENDENCY INFORMATION
5. SELECTING A NODE FOR EXECUTING A TARGET TRANSACTION
6. HANDLING AN INTERRUPTION ON A NON-DEDICATED NODE
7. MODIFYING PREDICTION CONFIGURATIONS
8. MANAGING WORK GROUP CREDITS

9. COMPUTER NETWORKS AND CLOUD NETWORKS
10. HARDWARE OVERVIEW
11. MISCELLANEOUS; EXTENSIONS

1. General Overview

One or more embodiments include selecting a node for executing a target transaction based on predicted idleness duration, where the node belongs to a first work group and the target transaction belongs to a second work group. An idleness duration is a time window during which a node of the first work group is predicted to be associated with a node usage by the first work group below a threshold value. The node usage is determined based on a compute usage by the first work group and/or a memory usage by the first work group. A node selection system adds a safety margin to a predicted runtime for the target transaction to compute a usage duration for the target transaction. The node selection system compares the usage duration with respective predicted idleness durations for nodes of the first work group. The node selection system selects a node that has a predicted idleness duration greater than or equal to the usage duration. The selected node of the first work group executes the target transaction of the second work group. The node of the first work group may be referred to as being "borrowed" by the second work group, or being "borrowed" for executing the target transaction of the second work group. In an embodiment, an attempt to assign the target transaction of the second work group to a node of the first work group is responsive to determining that nodes of the second work group are currently unavailable for executing the target transaction.

One or more embodiments include modifying prediction configurations used for selecting a node for executing a target transaction. Prediction configurations include an idleness prediction model, a runtime prediction model, and/or a safety margin. The idleness duration prediction model is trained using machine learning based on historical usage data of nodes. The runtime prediction model is trained using machine learning based on historical runtimes of transactions. A node selection system monitors interruptions to transactions of a particular work group executing on nodes of a different work group. The node selection system monitors accuracy of predicted idleness durations and/or accuracy of predicted runtimes. If the interruptions and/or prediction inaccuracies exceed an acceptable range, the node selection system modifies the idleness duration prediction model, the runtime prediction model, and/or the safety margin. The node selection system updates the idleness duration prediction model and/or the runtime prediction model using different historical data and/or different machine learning algorithms. The node selection system increases the safety margin by an incremental value. Hence, the node selection system is configured to perform self-diagnostics and ameliorate interruptions to transactions executing on borrowed nodes.

One or more embodiments include managing a work group credits associated with using non-dedicated nodes. Each work group may borrow nodes of each other work group. A node selection system records credits of each work group. When a node of a first work group executes and/or is selected for executing a target transaction of a second work group, one or more credits are transferred from the second work group to the first work group. A particular work group having insufficient credits is not able to request nodes of a different work group for executing the particular work group's transactions. Hence, the node selection system maintains a credit system associated with borrowing nodes.

One or more embodiments include selecting a node group for executing trees of a target transaction in parallel, where the node group belongs to a first work group and the target transaction belongs to a second work group. Each tree includes steps that are executable in parallel with steps of another tree. The node group is selected such that: (a) each node of the node group corresponds to a tree group, (b) each tree of the target transaction is within a tree group, and (c) each tree group is associated with a usage duration determined based on the predicted runtimes for the tree group's associated trees. A criterion for node group selection is that a predicted idleness duration of each node in the node group is greater than or equal to a usage duration associated with the corresponding tree group. In an embodiment, the node group consists of a minimum number of nodes without violating the above criterion. Hence, the borrowing of nodes is optimized by taking advantage of parallel execution information.

One or more embodiments include selecting a node for executing only a subset of steps of a target transaction, where the subset of steps includes at least one skippable step, and the node belongs to a first work group and the target transaction belongs to a second work group. A "hard dependency" from a first step to a second step refers to a requirement to re-execute the first step in a resumption of the target execution, if a previous execution of the target transaction is interrupted prior to completion of the second step. Where a first step has a hard dependency on a second step, and the second step has a hard dependency on a third step, the first step is referred to as having a "hard dependency chain" reaching the third step. A step within a subset of steps of the target transaction is "skippable" if the step has no hard dependency chains reaching a step subsequent to the subset of steps. The subset of steps to be executed on a borrowed node may be referred to as a "step group." A step group is associated with a usage duration determined based on the predicted runtimes for the step group's associated steps. A criterion for node selection is that a predicted idleness duration of the node is greater than or equal to the usage duration associated with the step group. In an embodiment, the step group includes a maximum number of steps without violating the above criterion. Hence, the borrowing of nodes is optimized by taking advantage of dependency information.

One or more embodiments described in this Specification and/or recited in the claims may not be included in this General Overview section.

2. Non-Dedicated Node Selection System Architecture

Figure 1B:
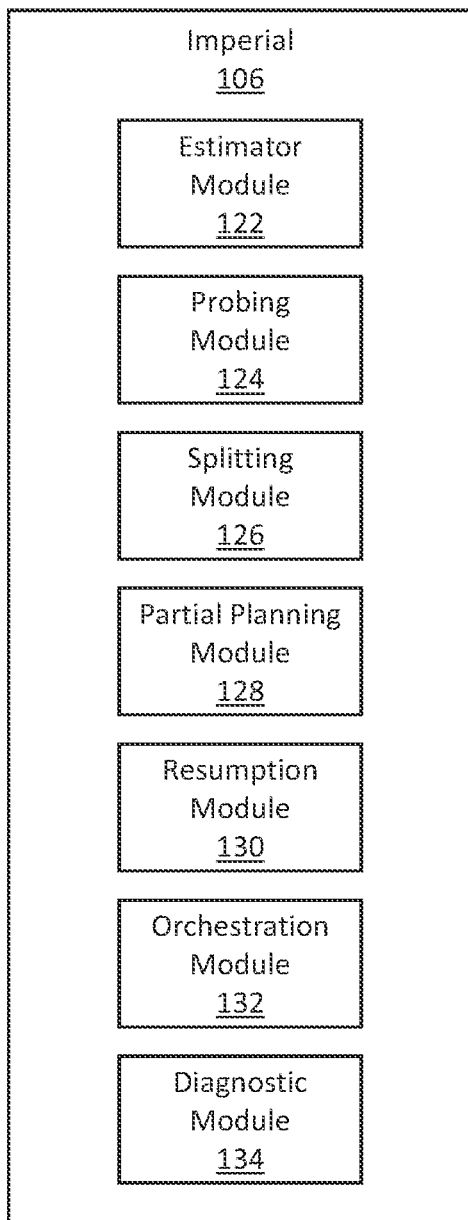

FIGS. 1A-1B illustrate a non-dedicated node selection system in accordance with one or more embodiments. As illustrated in FIG. 1A, a node selection system 100 includes nodes 104a-d of different work groups 102a-b, troopers 106a-d respectively associated with nodes 104a-d, an imperial 108, a credit manager 114, and data repositories 108, 116. In one or more embodiments, the system 100 may include more or fewer components than the components illustrated in FIG. 1A. The components illustrated in FIG. 1A may be local to or remote from each other. The components illustrated in FIG. 1A may be implemented in software and/or hardware. Each component may be distributed over multiple applications and/or machines. Multiple components may be combined into one application and/or machine.

Operations described with respect to one component may instead be performed by another component.

In an embodiment, a node (such as any of nodes 104*a-d*) is a network resource of a computing network, which may be a cloud network. An entity (such as a company) may purchase the use of the nodes from a network service provider. The payment amount per time period may be determined based on node usage. Additional embodiments and/or examples relating to computer networks are described below in Section 9, titled "Computer Networks and Cloud Networks."

Each node belongs to a work group. As illustrated, nodes 104*a-b* belong to work group 102*a*, and nodes 104*c-d* belong to work group 102*b*. A node of a work group is dedicated to executing transactions of the work group. The groupings of transactions may be based on various attributes of the transactions. As an example, transactions relating to development of different features of an application may be categorized into different work groups. As another example, transactions relating to development of an application and transactions relating to production of an application may be categorized into different work groups. As another example, transactions originating from different levels of developers may be categorized into different work groups. As another example, transactions originating from different types of clients may be categorized into different work groups.

In an embodiment, nodes of different work groups may be associated with different configurations, applications, network connections, communications protocols, security settings, and/or other attributes. The difference in node attributes may stem from the different needs associated with transactions of different types and/or preferences of different teams within an organization.

In an embodiment, a node of a work group being "dedicated" to transactions of the work group refers to the node being available for assignment to transactions of the work group unless the node is currently executing other transactions of the work group at full capacity. The availability of the node to transactions of the work group is evaluated without necessarily considering whether the node is currently executing transactions of other work groups.

Hence, transactions of a particular work group have priority to nodes of the particular work group over transactions of other work groups. When a transaction of a different work group is executing on a node of a particular work group, and a request for execution of a transaction of the particular work group is received, the request causes an interruption to the execution of the transaction of the different work group. Therefore, requests for transactions of a work group may interrupt executions of transactions of other work groups on a node of the work group. However, when a node of a particular work group is executing a first transaction of the particular work group, and a request for execution of a second transaction of the particular work group is received, the request does not necessarily interrupt the execution of the first transaction. Transactions of a particular work group have a same priority to nodes of the particular work group.

In one or more embodiments, a trooper (such as any of troopers 106*a-d*) is a monitoring program and/or application that is deployed and/or installed on each node. As illustrated, trooper 106*a* is implemented on node 106*a*; trooper 106*b* is implemented on node 106*b*; trooper 106*c* is implemented on node 106*c*; and trooper 106*d* is implemented on node 106*d*. A trooper is configured to monitor node usage, transaction runtimes, and/or interruptions to executions of transactions.

In one or more embodiments, an imperial 108 refers to hardware and/or software configured to select a node for executing a target transaction. The imperial 108 is also configured to handle interruptions, perform self-diagnostics, and/or maintain a credit system. Examples of such operations are additionally described below with reference to FIGS. 5A-11.

Referring to FIG. 1B, an imperial 108 includes an estimator module 122, a probing module 124, a splitting module 126, a partial planning module 128, a resumption module 130, an orchestration module 132, and a diagnostic module 134.

An estimator module 122 is configured to determine a predicted runtime for a target transaction. The estimator module 122 applies a runtime prediction model to attributes of a target transaction to determine a predicted runtime. The runtime prediction model is generated using machine learning based on historical runtimes of transactions.

As an example, a company may develop a social media application. Transactions associated with developing a posting feature of the application may be generally associated with longer runtimes than transactions associated with developing a commenting feature of the application. A runtime prediction model may be generated based on historical runtimes of transactions, including transactions associated with developing the posting feature and transactions associated with developing the commenting feature. The runtime prediction model may predict a longer runtime for a transaction associated with the posting feature than a transaction associated with the commenting feature.

A probing module 124 is configured to determine a predicted idleness duration for a node. The probing module 124 applies an idleness duration prediction model to a node to determine a predicted idleness duration. The idleness duration prediction model is generated using machine learning based on historical node usage of the node.

An idleness duration is a time window during which a node of a work group is predicted to be associated with a node usage by the work group below a threshold value. The node usage by the work group refers to a usage of the node resulting from executing transactions of the work group on the node. The node usage may be determined based at least on a compute usage by the work group and/or a memory usage by the work group.

As an example, a company may include a development team located on the US East Coast, and another development team located on the US West Coast. A first work group includes transactions originating from the East Coast team and a first set of nodes. A second work group includes transactions originating from the West Coast team and a second set of nodes. Workload from developers of the East Coast team may peak at 2 pm UTC to 7 pm UTC. Workload from developers of the West Coast team may peak from 5 pm UTC to 10 pm UTC. An idleness duration prediction model may be generated based on historical node usage of the nodes of both work groups. The idleness duration prediction model may predict a higher node usage for nodes of the first work group at 2 pm UTC than nodes of the second work group. The idleness duration prediction model may predict a similar node usage for nodes of the first work group at 5 pm UTC as nodes of the second work group. The idleness duration prediction model may predict a lesser node usage for nodes of the first work group at 8 pm UTC than nodes of the second work group.

As described above, a runtime prediction model and/or an idleness duration prediction model are generated using machine learning. A machine learning algorithm is applied to a set of training data to learn a target model f that best maps a set of input variables to a set of output variables. The machine learning algorithm may be iterated on successively updated sets of training data to improve and/or update the learned target model f. The training data may be updated based on, for example, feedback on the accuracy of the current target model f. Updated training data is fed back into the machine learning algorithm, which in turn updates the target model f. In an embodiment, a set of training data for inputting into a machine learning algorithm is obtained from troopers associated with nodes of a computing system. A trooper associated with particular node monitor runtimes of transactions executed on the particular node and/or levels of node usage (such as, compute usage, memory usage, and/or resource usage) for the particular node.

In an embodiment, a set of training data includes datasets and associated labels. The datasets are associated with input variables for a target model f. The associated labels are associated with an output variable of the target model f. A machine learning algorithm generates a target model f such that the target model f best fits the datasets of training data to the labels of the training data. Additionally or alternatively, a machine learning algorithm generates a target model f such that when the target model f is applied to the datasets of the training data, a maximum number of results determined by the target model f matches the labels of the training data. In another embodiment, a set of training data includes datasets with no labels. A machine learning algorithm discovers patterns in the datasets, analyzes probabilistic distributions, categorizes the datasets, and/or performs clustering.

In an embodiment, a machine learning algorithm may include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, bagging and random forest, boosting, back-propagation, and/or clustering. Different target models be generated based on different machine learning algorithms and/or different sets of training data.

In an embodiment, a single runtime prediction model is applicable to transactions of various work groups and/or transaction types. The runtime prediction model is trained using historical runtimes of transactions of various work groups and/or transaction types. In another embodiment, different runtime prediction models are applicable to transactions of different work groups. A runtime prediction model for a particular work group is trained using historical runtimes of transactions of the particular work group. Additionally or alternatively, different runtime prediction models are applicable to transactions of different types. A runtime prediction model for a particular transaction type is trained using historical runtimes of transactions of the particular transaction type.

In an embodiment, a single idleness duration prediction model is applicable to nodes of different work groups. The idleness duration prediction model is trained using historical node usage of nodes of various work groups. In another embodiment, different idleness duration prediction models are applicable to nodes of different work groups. An idleness duration prediction model for a particular work group is trained using historical node usage of nodes of the particular work group. In another embodiment, different idleness duration prediction models are applicable to each individual node. An idleness duration prediction model for a particular node is trained using historical node usage of the particular node.

In one or more embodiments, a splitting module 126 is configured to split trees of a target transaction into tree groups, each tree group to be assigned to a node. The splitting module 126 may attempt to split the trees into a minimum number of tree groups, while each node selected for a tree group has a predicted idleness duration greater than or equal to a usage duration of the tree group.

In one or more embodiments, a partial planning module 128 is configured to select a step group including at least one skippable step from a set of steps of a target transaction for assignment to a node. The partial planning module 128 may attempt to select a maximum number of steps into the step group, while a node selected for the step group has a predicted idleness duration greater than or equal to a usage duration of the step group.

In one or more embodiments, a resumption module 130 is configured to resume execution of a target transaction after a previous execution was interrupted. The resumption module 130 may determine a minimum set of steps that need to be executed for completion of the target transaction after interruption. The resumption module 130 may determine that completed steps having hard dependency chains reaching a non-completed step need to be re-executed. The resumption module 130 may determine that completed steps not having hard dependency chains reaching a non-completed step need not be re-executed. The resumption module 130 may package the steps to be executed as a new transaction. The resumption module 130 may trigger an estimator module 122 and/or probing module 124 to determine updated predictions to be used for selecting a node to execute the new transaction.

In one or more embodiments, an orchestration module 132 is configured to assign a target transaction (and/or steps thereof) to a node. The orchestration module 132 may transmit a command for a selected node to execute the target transaction (and/or steps thereof).

In one or more embodiments, a diagnostic module 134 is configured to identify metrics indicating under-performance of a node selection system. Such metrics include a number of interruptions over a time period, an accuracy rate of runtime predictions, and/or an accuracy rate of idleness duration predictions. If under-performance is found, the diagnostic module 134 may trigger updates to prediction configurations, such as a runtime prediction model, idleness duration prediction model, and/or safety margin.

Referring back to FIG. 1A, a container (such as any of containers 110a-b) is a unit of software that allows an application to be isolated from an executing environment. The standalone nature of a container allows the container to be transferred from one environment to another. A container may include code, runtime, system tools, system libraries, and settings.

In an embodiment, a container is generated for each transaction requested by a client. A container stores transaction information of the corresponding transaction. As illustrated, container 110a stores transaction information 112a for a transaction; container 110b stores transaction information 112b for another transaction. Transaction information includes steps of a transaction, and sequence of the steps. Additionally or alternatively, transaction information may include dependency information, parallel execution information, and/or transaction attributes. Dependency information and/or parallel execution information may initially be entered by a user (such as, an administrator) and/or determined by an application (for example, based on historical data). The dependency information and/or parallel execution information may be stored as metadata associated with a transaction. When a container is generated for the transaction, the container stores the metadata. Alternatively or additionally, the container stores the dependency information and/or parallel execution information in another format. If dependency information is not available, then each step of the transaction is assumed to have hard dependencies on every other step of the transaction. If parallel execution information is not available, then each step of the transaction is assumed to require sequential execution, with no parallel execution allowed. Transaction attributes include, for example, a user requesting the transaction, a client requesting the transaction, a transaction type or family of the transaction, and/or a work group of the transaction. Additionally or alternatively, a container may store which steps of a transaction have been completed, which steps have not been completed, and/or states associated with completed steps.

In an embodiment, a credit manager 114 is configured to manage a credit system associated with using nodes of a work group for transactions of another work group. Each work group is associated with a work group account (such as any of work group account 118a-b). For example, work group 102a is associated with work group account 118a; work group 102b is associated with work group account 118b. Each work group account records a number of credits owned by the associated work group. The credit manager 114 conditions the use of a node of a first work group for a transaction of a second group on whether the second work group possesses a requisite number of credits associated with the transaction. The credit manager 114 transfers the requisite number of credits from the second work group to the first work group after selection of a node from the first work group and/or after execution of the transaction on the selected node.

Information describing containers, transaction information, and/or work group accounts may be implemented across any of components within the system 100. However, this information is illustrated within data repository 109 and/or data repository 116 for purposes of clarity and explanation. A data repository (such as any of data repository 109, 116) is any type of storage unit and/or device (e.g., a file system, database, collection of tables, or any other storage mechanism) for storing data. Further, a data repository may include multiple different storage units and/or devices. The multiple different storage units and/or devices may or may not be of the same type or located at the same physical site. Further, a data repository may be implemented or executed on the same computing system as an imperial 108 and/or credit manager 114. Alternatively or additionally, a data repository may be implemented or executed on a computing system separate from an imperial 108 and/or credit manager 114. The data repository may be communicatively coupled to the imperial 108 and/or credit manager 114 via a direct connection or via a network.

In an embodiment, a trooper (such as any of troopers 106a-d), imperial 108 and/or credit manager 114 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a mainframe, a television, a content receiver, a set-top box, a printer, a mobile handset, a smartphone, and/or a personal digital assistant (PDA).

3. Idleness Predictions

Figure 2:
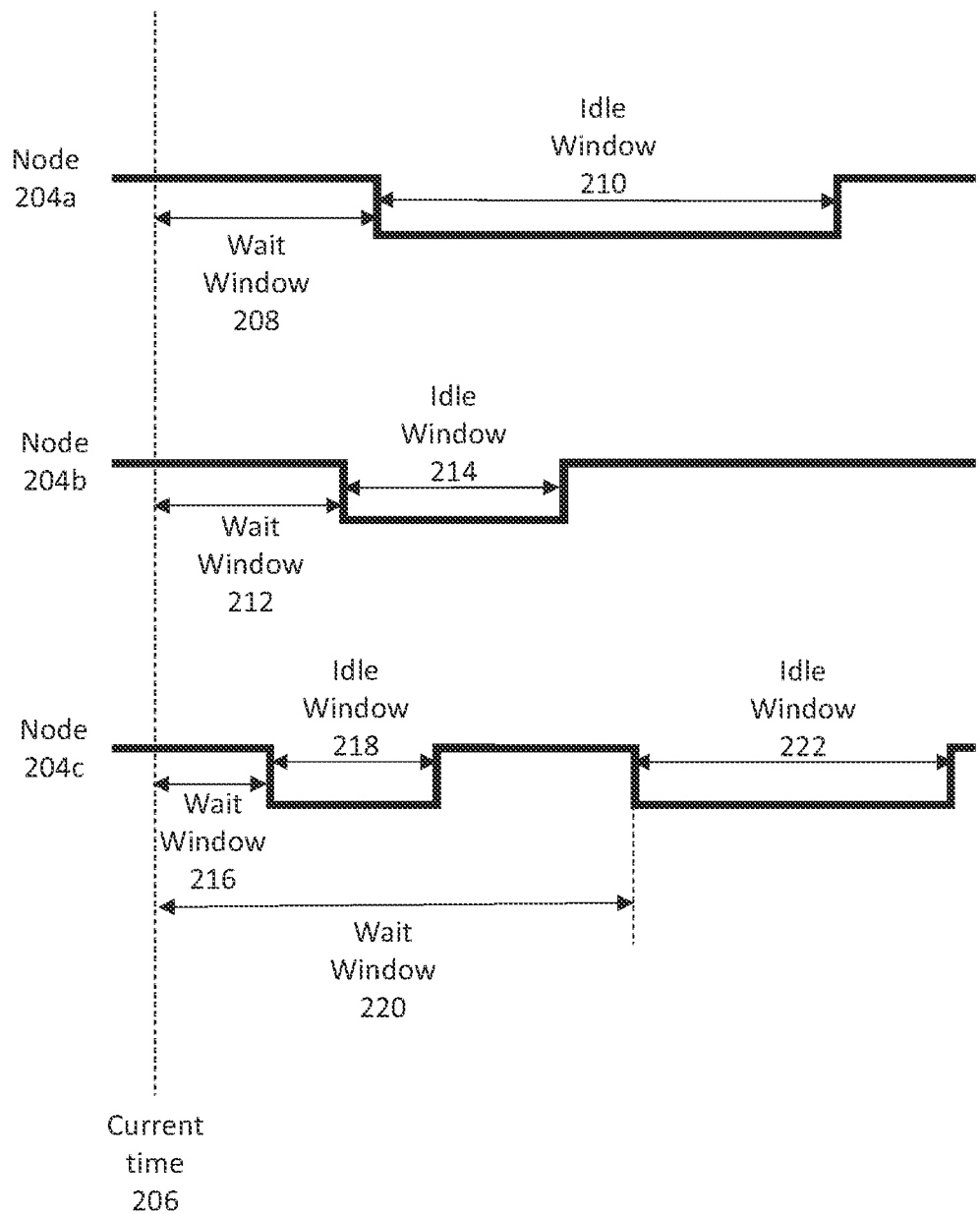
FIG. 2 illustrates example idleness predictions for nodes of a work group in accordance with one or more embodiments.

FIG. 2 illustrates example idleness predictions for nodes of a work group in accordance with one or more embodiments.

In an example, a computing network includes a set of nodes 204a-c. Idleness predictions 200 may be determined for the nodes 204a-c.

Based at least on historical node usage of node 204a, node 204a may be predicted to have an idleness window 210. A wait window 208 corresponding to the idleness window 210 is a duration from a current time 206 to a start of the idleness window 210.

Similarly, based at least on historical node usage of node 204b, node 204b may be predicted to have an idleness window 214. A wait window 212 corresponding to the idleness window 214 is a duration from the current time 206 to a start of the idleness window 214.

Based at least on historical node usage of node 204c, node 204c may be predicted to have an idleness window 218, and an idleness window 222. Time between the two idleness windows 218, 222 is not idle. A wait window 216 corresponding to the idleness window 218 is a duration from the current time 206 to a start of the idleness window 218. A wait window 220 corresponding to the idleness window 222 is a duration from the current time 206 to a start of the idleness window 222.

As illustrated, idleness window 210 of node 204a is longer than idleness window 214 of node 204b. Meanwhile, wait window 208 of node 204a is longer than wait window 212 of node 204b. If a predicted runtime of a target transaction is lesser than the duration of idleness window 214, then node 204b may be selected for the target transaction because wait window 212 is shorter. However, if a predicted runtime of a target transaction is greater than the duration of idleness window 214 and lesser than the duration of idleness window 210, then node 204a may be selected, assuming that wait window 208 is below an acceptable threshold value.

4. Parallel Execution Information and Dependency Information

Figure 3:
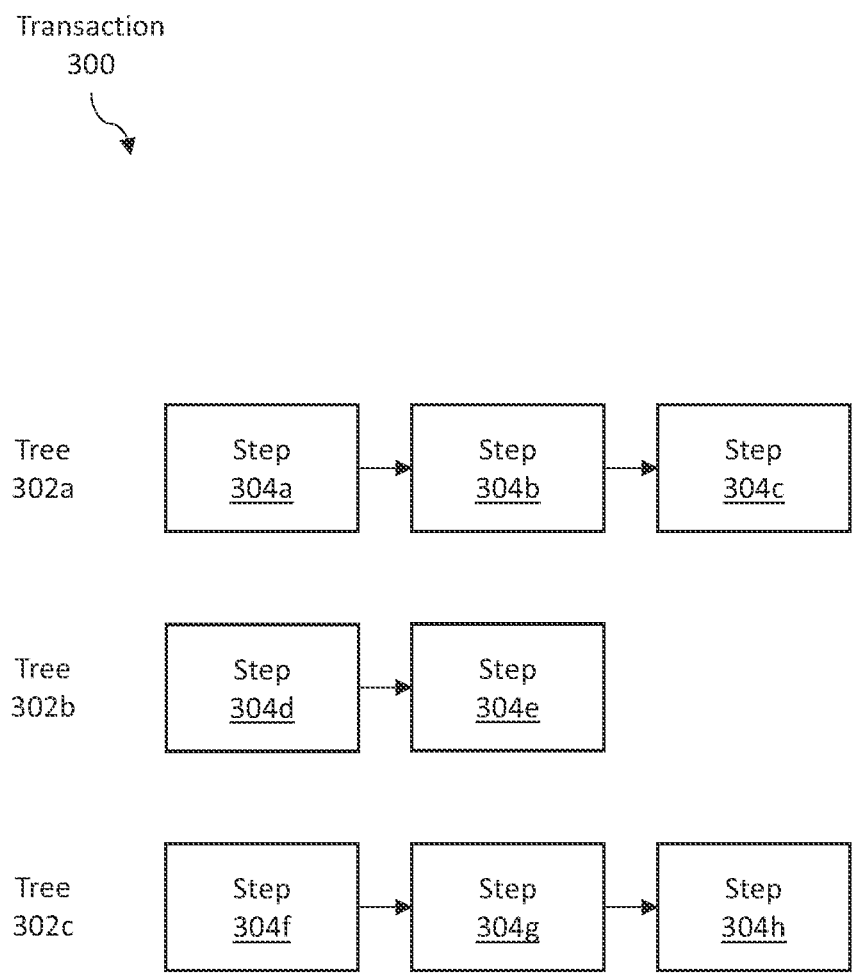
FIG. 3 illustrates a transaction associated with parallel execution information in accordance with one or more embodiments.

FIG. 3 illustrates a transaction associated with parallel execution information in accordance with one or more embodiments.

In an example, a transaction 300 includes a set of steps 304a-h. An administrator may have entered transaction information for different transaction types. The transaction 300 is associated with a particular transaction type. Based on the transaction information for the particular transaction type, sequential execution may be required for steps 304a-c; sequential execution may be required for 304d-e; and sequential execution may be required for steps 304f-h. Hence, for example, step 304a must be executed before step 304b, which must be executed before step 304c. Meanwhile, steps 304a-c may be executed in parallel with any of steps 304d-h; steps 304d-e may be executed in parallel with any of steps 304a-c, 304f-h; and steps 304f-h may be executed in parallel with any of steps 304a-e. Hence, steps 304a-c may be referred to as forming a tree 302a; steps 304d-e may be referred to as forming a tree 302b; and steps 304f-h may be referred to as forming a tree 302c. Each tree 302a-c may be executed in parallel with other trees of the transaction 300.

Figure 4:
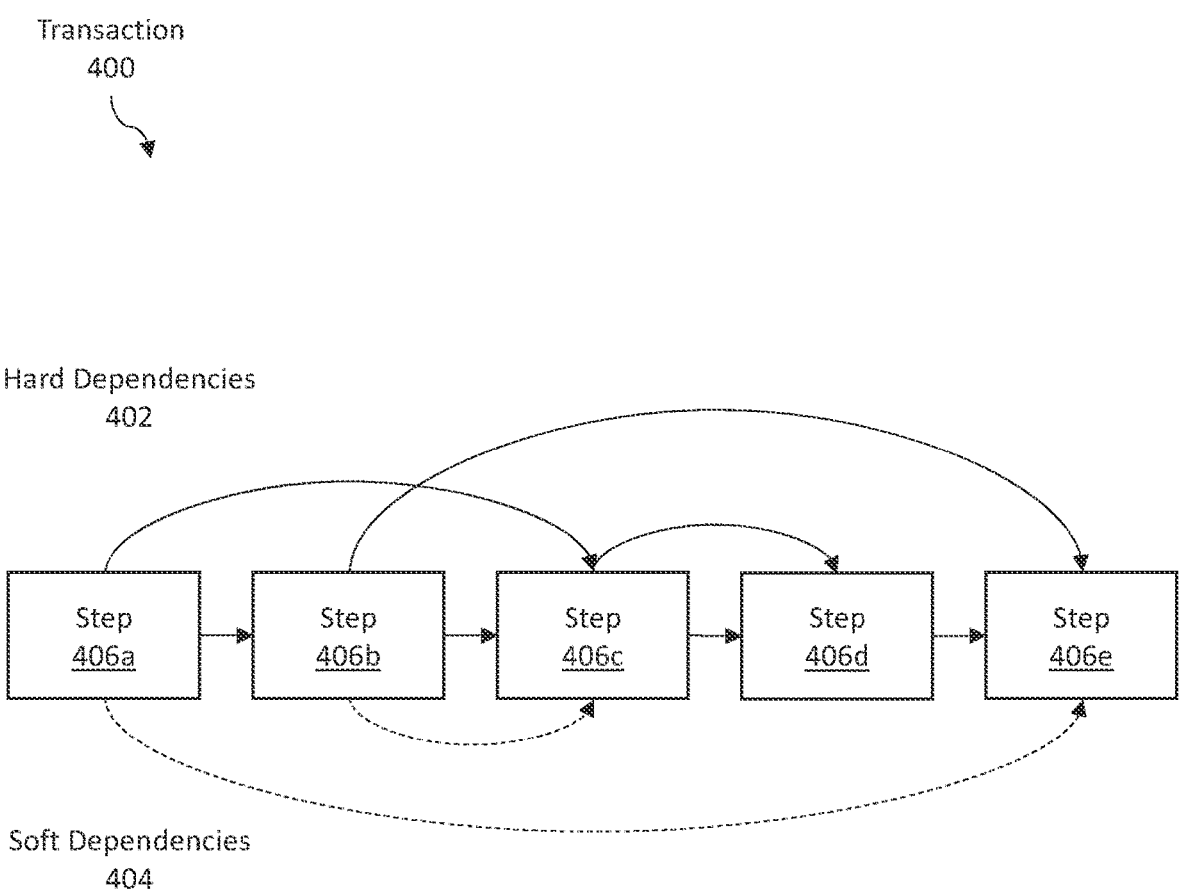
FIG. 4 illustrates a transaction associated with dependency information in accordance with one or more embodiments.
Figure 5A:
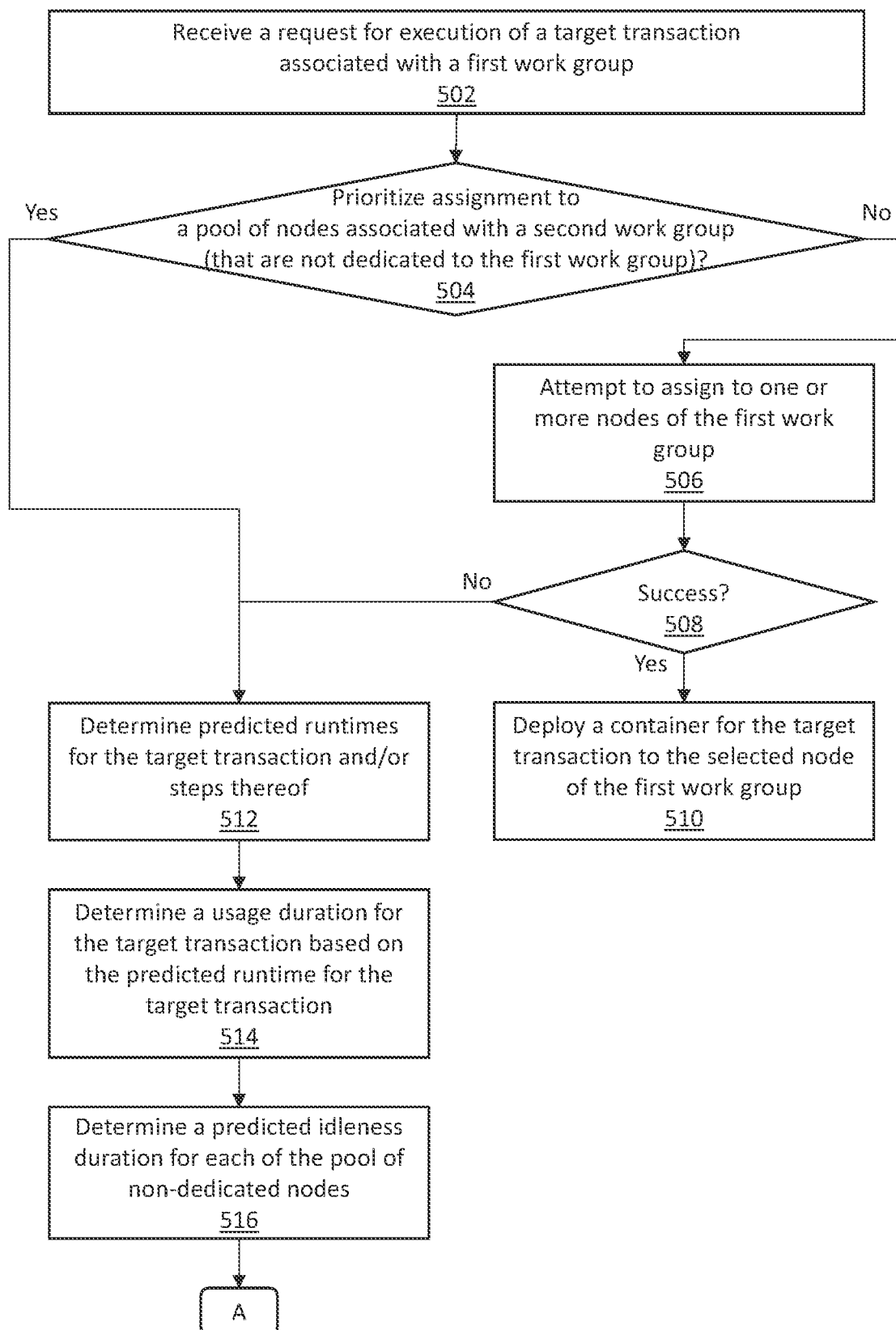
FIGS. 5A-5G illustrate an example set of operations for selecting a node for executing a target transaction in accordance with one or more embodiments.
Figure 5B:
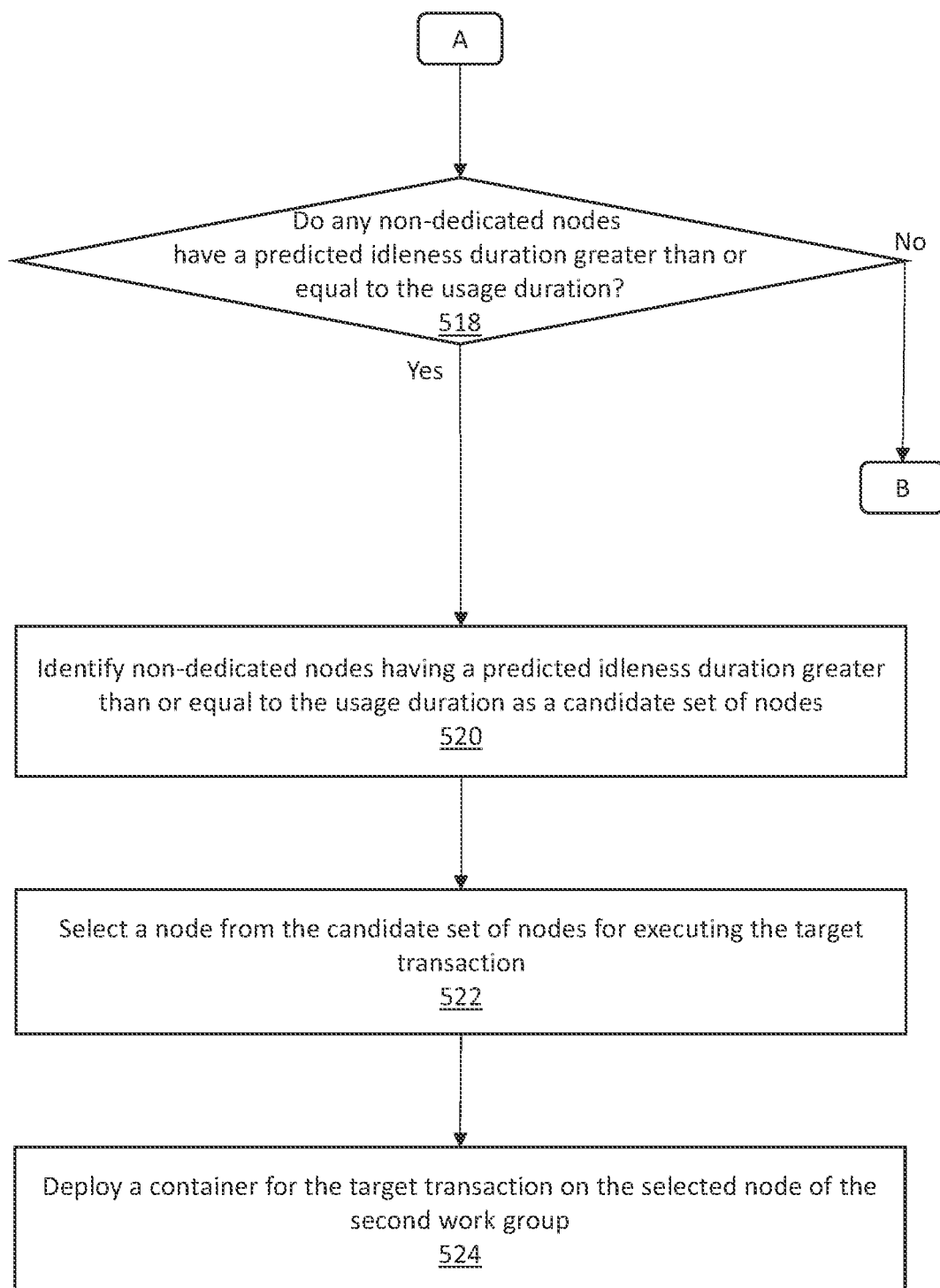
Figure 5C:
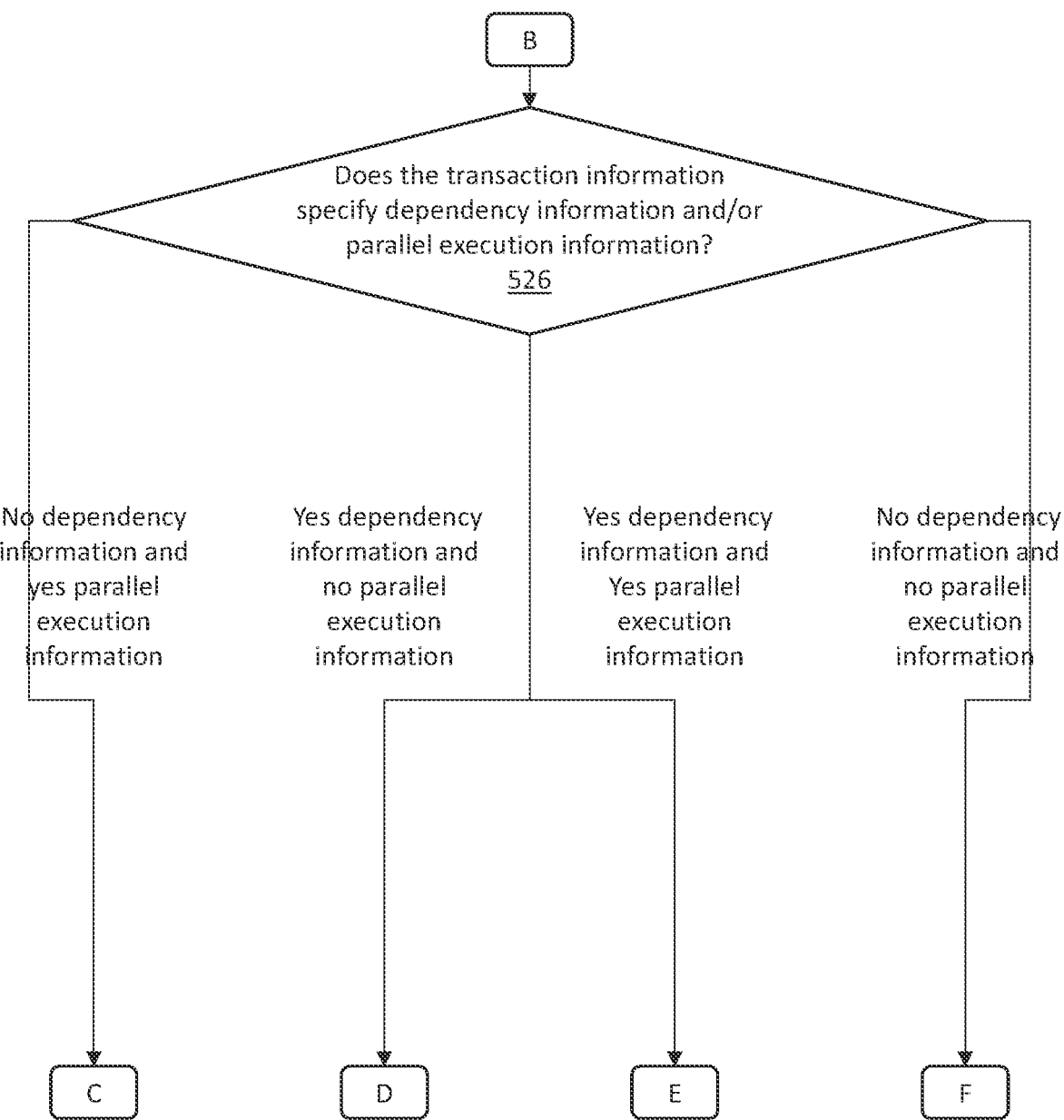
Figure 5D:
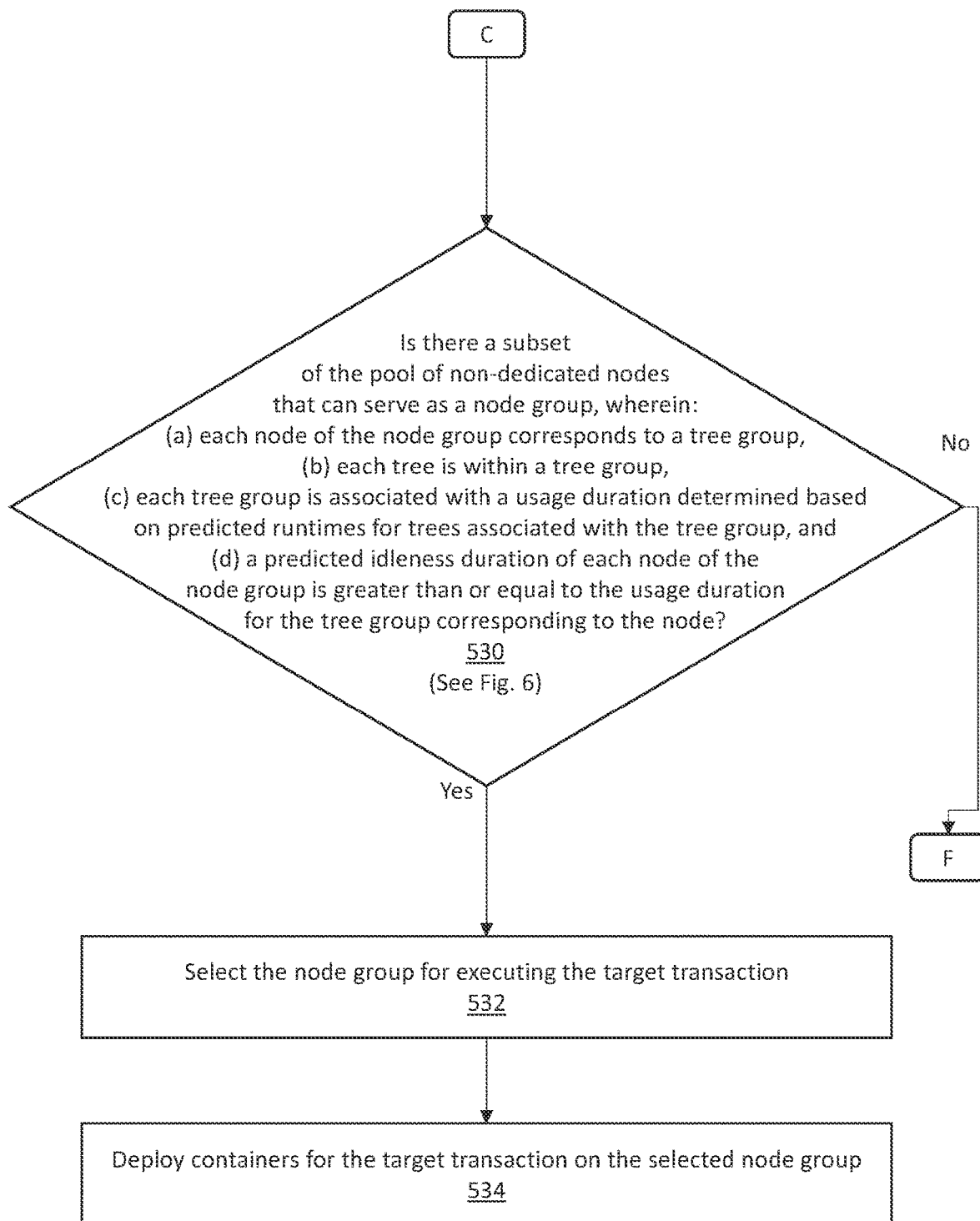
Figure 5E:
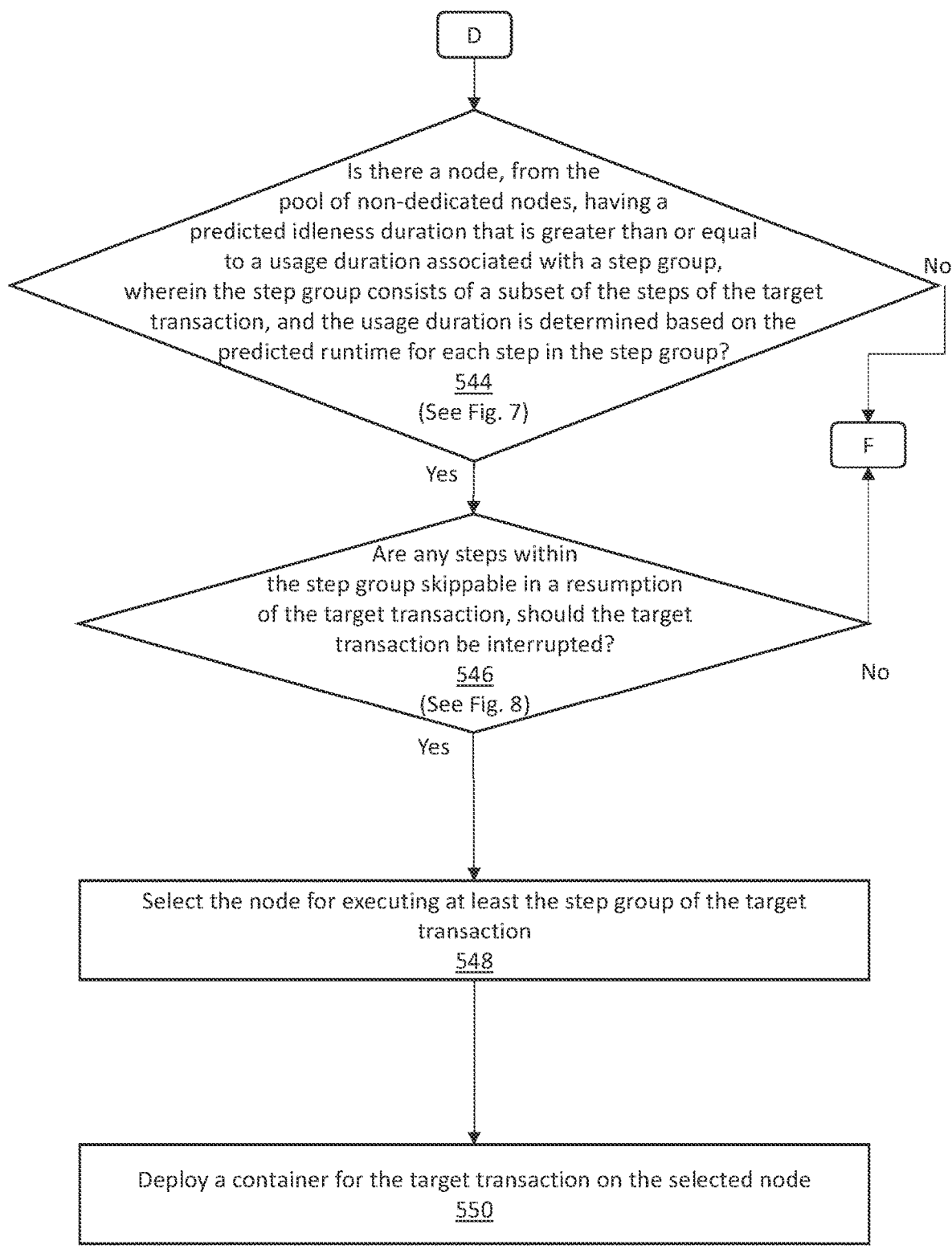
Figure 5F:
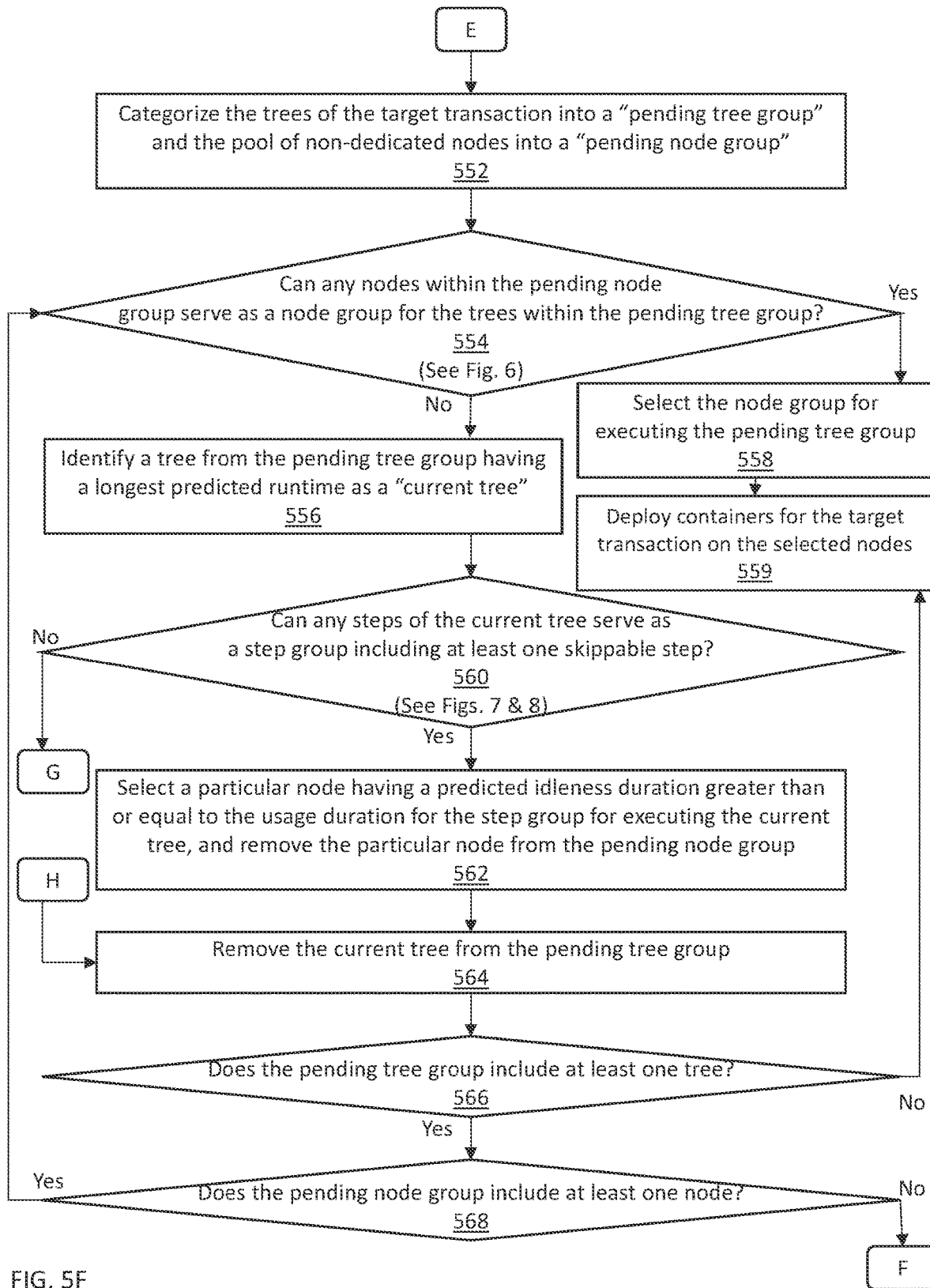
Figure 5G:
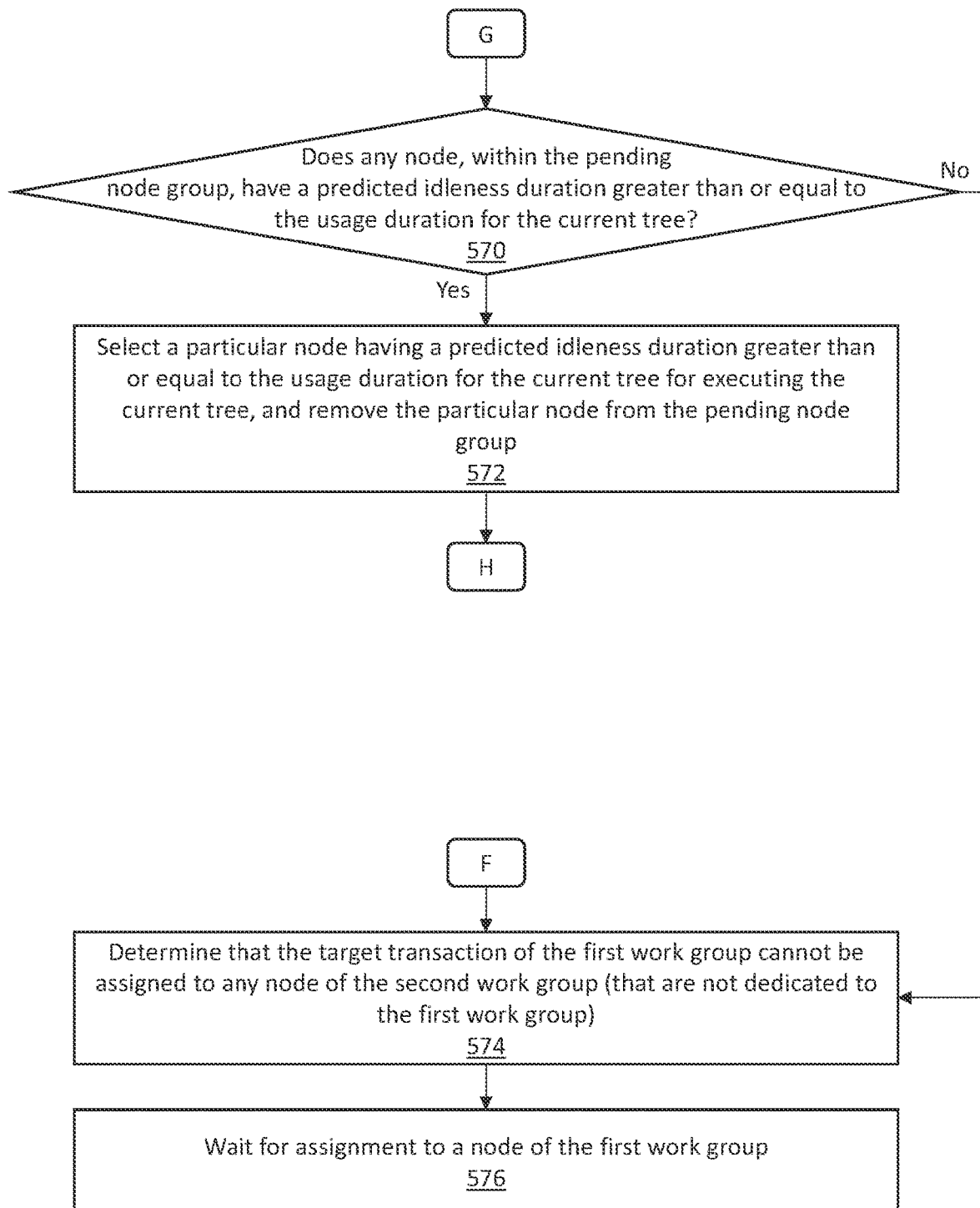

FIG. 4 illustrates a transaction associated with dependency information in accordance with one or more embodiments.

In an example, a transaction 400 includes a set of steps 406a-e. An administrator may have entered transaction information for different transaction types. The transaction 400 is associated with a particular transaction type. Based on the transaction information for the particular transaction type, the transaction 400 is associated with hard dependencies 402 and soft dependencies 404.

A soft dependency 404 from a first step to a second step refers to a requirement to use a state resulting from execution of the first step in execution of the second step. If the transaction is interrupted after completion of the first step, the state resulting from the first step is stored. During resumption of the transaction, the stored state is loaded and used in the continued execution of the transaction, without needing to re-execute the first step. Loading and using the stored state during the resumption of the transaction may be referred to as a "ghost execution" of the first step during the resumption of the transaction.

A hard dependency 402 from a first step to a second step refers to a requirement to re-execute the first step in a resumption of the target execution, if a previous execution of the target transaction is interrupted prior to completion of the second step. A particular step may be associated with a hard dependency if a state resulting from execution of the particular step is of such a great complexity and/or size that re-executing the particular step during resumption of the transaction is more efficient than the process of storing and loading the state resulting from the particular step.

As illustrated, a hard dependency stems from step 406a to step 406c; a hard dependency stems from step 406b to step 406e; and a hard dependency stems from step 406c to step 406d. A soft dependency stems from step 406a to step 406e; and a soft dependency stems from step 406b to step 406c. Hard dependencies may be linked together to form a hard dependency chain. Since a hard dependency stems from 406a to step 406c and a hard dependency stems from step 406c to step 406d, steps 406a, 406c, and 406d are referred to as being associated with a hard dependency chain. In other words, a hard dependency chain from step 406a reaches step 406e.

5. Selecting a Node for Executing a Target Transaction

One or more operations illustrated in FIGS. 5A-8 may be modified, rearranged, or omitted all together. Accordingly, the particular sequence of operations illustrated in FIGS. 5A-8 should not be construed as limiting the scope of one or more embodiments.

FIGS. 5A-5G illustrate an example set of operations for selecting a node for executing a target transaction in accordance with one or more embodiments.

One or more embodiments include receiving a request for execution of a target transaction associated with a first work group (Operation 502). An imperial receives a request for execution of a target transaction of a first work group. The request may be transmitted to the imperial from a client.

One or more embodiments include determining whether to prioritize assignment of the target transaction to a pool of nodes associated with a second work group (that are not dedicated to transactions of the first work group) (Operation 504). The imperial determines whether to prioritize assignment of the target transaction to a pool of nodes associated with a second work group over a pool of nodes associated with the first work group. The pool of nodes of the second work group are not dedicated to transactions of the first work group, and hence are not dedicated to the target transaction. The pool of nodes of the second work group may be referred to herein as "non-dedicated nodes." The pool of nodes of the first work group are dedicated to transactions of the first work group, and hence are dedicated to the target transaction. The pool of nodes of the first work group may be referred to herein as "dedicated nodes."

The imperial determines the priority of assignment to non-dedicated nodes relative to dedicated nodes based on priority configurations. The priority configurations may be set by a user (such as, an administrator) and/or determined by an application. A priority configuration may be applicable to all transactions of the first work group. Alternatively, different priority configurations may be applicable to different types of transactions of the first work group. As an example, an imperial may determine a transaction type of a target transaction. The imperial may determine that a priority configuration set for the transaction type requires that assignment to non-dedicated nodes is prioritized over assignment to dedicated nodes. Hence, the imperial may determine that assignment to non-dedicated nodes is prioritized for the target transaction.

If assignment to the non-dedicated nodes is not prioritized, one or more embodiments include attempting to assign the target transaction to one or more nodes of the first work group (Operation 506). The imperial attempts to assign the target transaction to one or more nodes of the first work group. Since the nodes of the first work group are dedicated nodes, a node of the first work group are available for executing the target transaction, unless the node is currently serving another transaction of the first work group.

The imperial determines a level of resources (such as compute and/or memory) required for executing the target transaction. The imperial may determine the required level of resources based on attributes associated with the target transaction (such as, a size of input parameters; a number, size, complexity of the steps of the target transaction; and/or a size of an expected output). Additionally or alternatively, the imperial may determine the required level of resources based on a usage prediction model. Resource usage of historical transactions along with attributes of the historical transactions may be input to a machine learning algorithm to generate the usage prediction model. The imperial may input attributes of the target transaction into the usage prediction model to determine the required level of resources for the target transaction. Additionally or alternatively, the imperial may determine the required level of resources based on levels of resources used in executing historical transactions similar to the target transaction. Historical transactions that are similar to the target transaction may be, for example, historical transactions that are of the same type or family as the target transaction and/or share one or more other attributes with the target transaction.

For each dedicated node in the first work group, the imperial determines a capacity of the node, which is the node's total level of resources (such as, compute and/or memory). The imperial also determines a level of resources of the node being used for executing any transactions of the first work group. The difference between the node's capacity and the level of resources being used for executing transactions of the first work group is the level of resources available for executing the target transaction. Since the target transaction has priority to the dedicated node over transactions of other work groups, the available level of resources of the dedicated node is not dependent on resources used by transactions of other work groups.

The imperial determines whether the node's available level of resources is greater than or equal to the required level of resources for the target transaction. The imperial selects a node whose available level of resources is greater than or equal to the required level of resources for executing the target transaction. Alternatively, if no dedicated nodes have sufficient resources for the target transaction, then the imperial determines that the target transaction cannot be successfully assigned to a dedicated node.

In selecting a dedicated node for the target transaction, the imperial does not necessarily need any analysis on any predicted time window associated with the available level of resources of nodes. The imperial does not need, for example, a predicted duration in which an available level of resources will remain above a threshold value. As long as the node's available level of resources is determined to be sufficient at a certain time, the target transaction may be assigned to the node.

One or more embodiments include determining whether assignment of the target transaction to a node of the first work group is successful (Operation 508). The imperial determines whether any dedicated node has an available level of resources sufficient for executing the target transaction. If a dedicated node has sufficient resources for executing the target transaction, the imperial selects the dedicated node for executing the target transaction. The imperial determines that assignment to the dedicated node is successful. Alternatively, if no dedicated nodes have sufficient resources, the imperial determines that assignment to a dedicated node is unsuccessful.

One or more embodiments include deploying a container for the target transaction to the selected node of the first work group (Operation 510). If a container has not yet been generated for the target transaction, the imperial generates a container corresponding to the target transaction. The imperial deploys the container corresponding to the target transaction to the dedicated node selected for executing the target transaction.

If assignment to a dedicated node is unsuccessful (Operation 508), or if assignment to the non-dedicated nodes is prioritized (Operation 504), one or more embodiments include determining predicted runtimes for the target transaction and/or steps of the target transaction (Operation 512). The imperial determines a predicted runtime for the target transaction. Additionally or alternatively, the imperial determines predicted runtimes for each step and/or tree of the target transaction.

The imperial obtains a runtime prediction model. The runtime prediction model is trained via machine learning based on runtimes of historical transactions. Runtimes of historical transactions along with attributes of the historical transactions may be input to a machine learning algorithm to generate the runtime prediction model. The imperial may input attributes of the target transaction into the runtime prediction model to determine the predicted runtime for the target transaction. Additionally or alternatively, runtimes of previously-executed steps and/or trees along with attributes of the steps and/or trees may be input to a machine learning algorithm to generate the runtime prediction model. The imperial may input attributes of the steps and/or trees of the target transaction into the runtime prediction model to determine the predicted runtimes for the steps and/or trees.

The imperial may determine a sum of the predicted runtimes for the steps and/or trees to obtain a total predicted runtime for the target transaction.

One or more embodiments include determining a usage duration for the target transaction based on the predicted runtime for the target transaction (Operation 514). The imperial obtains a safety margin. The safety margin may be a configuration set by an administrator. Additionally or alternatively, the safety margin may be set and/or updated by an application.

The imperial adds the safety margin to the predicted runtime for the target transaction to obtain a usage duration for the target transaction. As an example, a safety margin may be a number of seconds, such as 0.05 seconds, to be added to a predicted runtime. If a predicted runtime is 1.03 seconds, then a usage duration is 1.03+0.05=1.08 seconds. As another example, a safety margin may be a percentage, such as 2%. If a predicted runtime is 1.03 seconds, then a usage duration is 1.03×1.02=1.05 seconds.

One or more embodiments include determining a predicted idleness duration for each of the pool of non-dedicated nodes (Operation 516). The imperial obtains an idleness duration prediction model. The idleness duration prediction model may be generated via machine learning based on historical node usage of the nodes. In an embodiment, a single idleness duration prediction model may be applicable to multiple nodes. Hence, historical node usage of each node over a time period is input to a machine learning algorithm to generate the idleness duration prediction model. In another embodiment, a different idleness duration prediction model corresponds to each individual node. Hence, historical node usage of a particular node over a time period is input to a machine learning algorithm to generate the idleness duration prediction model for the particular node.

In an embodiment, the historical node usage is given in units of compute use, memory use, and/or resource use. The idleness duration prediction model trained on the historical node usage outputs a predicted level of compute use, memory use, and/or resource use for a node. The imperial determines an overall predicted node usage based on the predicted level of compute use, memory use, and/or resource use. The imperial applies a threshold cutoff to the predicted node usage. Any predicted node usage below the threshold cutoff is considered idleness.

In another embodiment, the historical node usage is as times at which idleness is found, wherein idleness indicates a node usage below a threshold value. As an example, a training set may include the following idleness data for a particular node:

10:00:00 am: Idle
10:00:01 am: Idle
10:00:02 am: Non-idle
10:00:03 am: Non-idle
10:00:04 am: Non-idle
10:00:05 am: Idle
10:00:06 am: Idle
10:00:07 am: Non-idle In this example, the idleness duration prediction model trained on the historical node usage outputs whether a node is predicted to be idle at a particular time.

In addition to identifying a runtime prediction model, the imperial identifies a time period of interest for idleness duration prediction. The time period of interest is a maximum time window from the current time in which the target transaction is considered for execution by a non-dedicated node. The imperial applies the idleness duration prediction model to determine any predicted idleness time windows within the time period of interest. Any idleness windows that would be predicted outside of the time period of interest are not necessarily considered in attempting to assign the target transaction to a non-dedicated node. As an example, transaction information for a target transaction may indicate that any assignment to a non-dedicated node must be within 5 minutes, otherwise the target transaction should wait for assignment to a dedicated node. Hence, an imperial may determine that a time period of interest is 5 minutes from the time that the request for the target transaction is received. The imperial may apply an idleness duration prediction model to the time period of interest.

A continuous time during which a node is predicted to be idle is a predicted idleness window. The imperial determines a predicted idleness duration and a wait time corresponding to each predicted idleness window. A difference between a start time and end time of a predicted idleness window is a predicted idleness duration. A difference between the current time and the start time of the predicted idleness window is a wait time corresponding to the predicted idleness window.

In an embodiment, the imperial filters predicted idleness windows based on corresponding wait times. If a wait time of a predicted idleness window is greater than a threshold value, then the imperial does not take the predicted idleness duration of the predicted idleness window into consideration when selecting a node for executing the target transaction. The imperial does not attempt to assign the target transaction to a node for execution during a filtered-out idleness window.

Optionally, the imperial filters the pool of nodes of the second work group based on resource availability. The imperial determines a predicted resource availability for each node over a particular time period. The particular time period may be the same as the time period of interest over which the idleness duration prediction model is used to find idleness windows. The predicted resource availability may be determined based on historical node usage of the node. The imperial also determines a predicted level of resources required for executing the target transaction. Examples of operations for determining a level of resources required for executing a transaction are described above with reference to Operation 506. The imperial identifies a maximum level of resources required for executing the target transaction as a peak resource load associated with the target transaction. The imperial filters out any nodes having a predicted resource availability less than the predicted peak resource load for the target transaction. The imperial does not take the filtered-out nodes into consideration when selecting a node for executing the target transaction. The imperial does not attempt to assign the target transaction to a filtered-out node.

One or more embodiments include determining whether any non-dedicated nodes have a predicted idleness duration greater than or equal to the usage duration for the target transaction (Operation 518). The imperial compares the predicted idleness duration of one or more non-dedicated nodes with the usage duration for the target transaction.

If at least one non-dedicated node has a predicted idleness duration greater than or equal to the usage duration, one or more embodiments include identifying non-dedicated nodes having a predicted idleness duration greater than or equal to the usage duration as a candidate set of nodes (Operation 520). The imperial identifies non-dedicated nodes having a predicted idleness duration greater than or equal to the usage duration as a candidate set of nodes.

In an embodiment, the imperial filters the predicted idleness windows using the corresponding wait times. Any predicted idleness windows with a wait time above a threshold value are not considered. The candidate set of nodes includes nodes having a predicted idleness window associated with (a) a predicted idleness duration greater than or equal to the usage duration and (b) a wat time less than the threshold value.

One or more embodiments include selecting a node from the candidate set of nodes for executing the target transaction (Operation 522). The imperial selects a node from the candidate set of nodes for executing the target transaction. In an embodiment, the imperial selects a node from the candidate set of nodes associated with the least wait time. Alternatively, the imperial selects any node from the candidate set of nodes associated with a wait time less than a threshold value. In another embodiment, the imperial calculates a score for each of the candidate set of nodes based on the predicted idleness duration and wait time for each node. Higher scores indicate longer predicted idleness durations and/or shorter wait times; lower scores indicate shorter predicted idleness durations and longer wait times. The imperial selects a node from the candidate set of nodes having the highest score.

One or more embodiments include deploying a container for the target transaction on the selected node of the second work group (Operation 524). Descriptions pertaining to deploying a container for a target transaction on a node are provided above with reference to Operation 510.

Optionally, the imperial prepares the non-dedicated node of the second work group for the container before deploying the container to the non-dedicated node. The imperial may need to modify node configurations, network connections, and/or security settings. Such modifications may be temporary, being applied to the node of the second work group only while the node is serving the target transaction of the first work group. The imperial may restore the node of the second work group to the original configurations and/or settings after the node is no longer executing the target transaction of the first work group. Some examples of modifications are provided below; additional and/or alternative modifications may be used.

In an embodiment, nodes of different work groups are associated with different configurations. A configuration of a node of the second work group may need to be modified in order for the node to execute the target transaction of the first work group. The imperial may modify the configuration of the non-dedicated node to match the configuration of nodes in the first work group.

In an embodiment, nodes of different work groups are associated with different overlay networks on top of an underlying computing network. Network settings may need to be modified in order for a node of the second work group to execute the target transaction of the first work group. The imperial may modify the network settings such that the non-dedicated node may communicate with nodes of the first work group within the same overlay network.

If no non-dedicated nodes have a predicted idleness duration greater than or equal to the usage duration (Operation 518), one or more embodiments include determining whether the transaction information for the target transaction specifies dependency information and/or parallel execution information (Operation 526). The imperial obtains transaction information for the target transaction. The imperial determines whether the transaction information specifies any dependency information and/or parallel transaction information. Four different scenarios may occur:

Scenario 1: dependency information is not specified and parallel execution information is specified;

Scenario 2: dependency information is specified and parallel execution information is not specified;

Scenario 3: dependency information is specified and parallel execution information is specified; and Scenario 4: dependency information is not specified and parallel execution information is not specified.

In Scenario 1, dependency information is not specified and parallel execution information is specified. One or more embodiments include determining whether there is a subset of the pool of non-dedicated nodes that can serve as a node group, wherein (a) each node of the node group corresponds to a tree group, (b) each tree is within a tree group, (c) each tree group is associated with a usage duration determined based on predicted runtimes for trees associated with the tree group, and (d) a predicted idleness duration of each node of the node group is greater than or equal to the usage duration for the tree group corresponding to the node (Operation 530).

Examples of operations for identifying a node group are described below with reference to FIG. 6.

If the node group is found, one or more embodiments include selecting the node group for executing the target transaction (Operation 532). The imperial selects the node group for executing the target transaction. If more than one combination of nodes can serve as a node group, then the imperial may select a combination that includes nodes having the least wait times as the node group. The imperial assigns trees of a tree group to a node corresponding to the tree group. Hence each tree of the target transaction is assigned to a node of the node group.

As an example, a target transaction may include Tree A, Tree B, Tree C, Tree D, Tree E, Tree F. An imperial may identify a node group including Node A, Node B, and Node C. Node A corresponds to a tree group including Tree A, Tree B. Node B corresponds to a tree group including Tree C. Node C corresponds to a tree group including Tree D, Tree E, Tree F. The imperial may select the node group for executing the target transaction. Hence, the imperial may assign Tree A, Tree B to Node A. The imperial may assign Tree C to Node B. The imperial may assign Tree D, Tree E, Tree F to Node C.

One or more embodiments include deploying containers for the target transaction on the selected node group (Operation 534). If a container has not yet been generated for each tree of the target transaction, the imperial generates a container corresponding to each tree of the target transaction. The imperial deploys the container corresponding to a particular tree onto a node, of the node group, corresponding to a tree group including the particular tree.

Descriptions pertaining to optional preparation of a non-dedicated node are provided above with reference to Operation 524.

In Scenario 2, dependency information is specified and parallel execution information is not specified. One or more embodiments include determining whether there is a node from the pool of non-dedicated nodes having a predicted idleness duration greater than or equal to a usage duration associated with a step group, wherein the step group consists of a subset of the steps of the target transaction, and the usage duration is determined based on the predicted runtime for each step in the step group (Operation 544).

Examples of operations for identifying a step group are described below with reference to FIG. 7.

One or more embodiments include determining whether any steps within the step group are skippable in a resumption of the target transaction, should the target transaction be interrupted (Operation 546).

Examples of operations for determining whether any steps within a step group are skippable are described below with reference to FIG. 8.

If at least one step is skippable, one or more embodiments include selecting the node for executing at least the step group of the target transaction (Operation 548). The imperial selects a non-dedicated node having a predicted idleness duration greater than or equal to the usage duration of the step group. If more than one node has a predicted idleness duration greater than or equal to the usage duration of the step group, then the imperial may select a node with the least wait time. The imperial assigns the steps of the step group to the selected node. Alternatively, the target transaction assigns the target transaction to the selected node. The selected node is allowed to continue executing the target transaction (even beyond the steps of the step node) until an interruption is received.

One or more embodiments include deploying a container for the target transaction on the selected node (Operation 550). Descriptions pertaining to deploying a container for a target transaction on a node are provided above with reference to Operation 510. Descriptions pertaining to optional preparation of a non-dedicated node are provided above with reference to Operation 524.

In Scenario 3, dependency information is specified and parallel execution information is specified. One or more embodiments include categorizing the tress of the target transaction into a "pending tree group" and the pool of non-dedicated nodes into a "pending node group" (Operation 552). The imperial categorizes the tress of the target transaction into a "pending tree group" and the pool of non-dedicated nodes into a "pending node group."

One or more embodiments include determining whether any nodes within the pending node group can serve as a node group for the trees of the pending tree group (Operation 554). The imperial attempts to find a node group for the trees of the pending tree group, wherein (a) each node of the node group corresponds to a tree group, (b) each tree of the pending tree group is within a tree group (however trees not of the pending tree group are not placed into any tree group), (c) each tree group is associated with a usage duration determined based on predicted runtimes for trees associated with the tree group, and (d) a predicted idleness duration of each node of the node group is greater than or equal to the usage duration for the tree group corresponding to the node. The imperial does not consider trees outside of the pending tree group when attempting to find the node group.

Examples of operations for identifying a node group are described below with reference to FIG. 6.

If a node group is found, one or more embodiments include selecting the node group for executing the pending tree group (Operation 558). The imperial selects the node group for executing the trees within the pending tree group. Descriptions pertaining to selecting a node group for a plurality of trees are provided above with reference to Operation 534.

One or more embodiments include deploying containers for the target transaction on the selected nodes (Operation 559).

If a container has not yet been generated for each tree of the target transaction, the imperial generates a container corresponding to each tree of the target transaction.

The imperial identifies the trees of the pending tree group. For each tree of the pending tree group, the imperial deploys the corresponding container to a node, of the node group, corresponding to a tree group including the tree.

For each tree that is assigned to a node through iterations of Operation 562 (further discussed below), the imperial deploys the corresponding container to the assigned node.

Descriptions pertaining to optional preparation of a non-dedicated node are provided above with reference to Operation 524.

If a node group is not found, one or more embodiments include identifying a tree from the pending tree group having a longest predicted runtime as a "current tree" (Operation 556). The imperial identifies a tree from the pending tree group having a longest predicted runtime. The identified tree may be referred to as a "current tree." The imperial proceeds to analyze the current tree based on dependency information.

One or more embodiments include determining whether any steps of the current tree can serve as a step group including at least one skippable step (Operation 560). The imperial attempts to identify a step group from the steps of the current tree based on the pending node group. The imperial determines whether any node, from the pending node group, has a predicted idleness duration that is greater than or equal to a usage duration for a step group, wherein the step group consists of a subset of the steps of the current tree, and the usage duration is determined based on the predicted runtime for each step in the step group. Examples of operations for identifying a step group are described below with reference to FIG. 7. Additionally, the imperial determines whether any steps within the step group are skippable in a resumption of the target transaction, should the target transaction be interrupted. Examples of operations for determining whether any steps within a step group are skippable are described below with reference to FIG. 8.

If a step group is found, one or more embodiments include selecting a particular node having a predicted idleness duration greater than or equal to the usage duration for the step group, and removing the particular node from the pending node group (Operation 562). The imperial selecting a particular node having a predicted idleness duration greater than or equal to the usage duration for the step group. The imperial selects the particular node for executing the current tree. The imperial removes the particular node from the pending node group.

If a step group is not found, one or more embodiments include determining whether any node, within the pending node group, has a predicted idleness duration greater than or equal to the usage duration for the current tree (Operation 570). Given that a subset of the steps of the current tree cannot form a step group, a predicted idleness duration of a node must accommodate a usage duration for all steps of the current tree. The imperial determines whether any node, within the pending node group, has a predicted idleness duration greater than or equal to the usage duration for the current tree.

One or more embodiments include selecting a particular node having a predicted idleness duration greater than or equal to the usage duration for the current tree, and removing the particular node from the pending node group (Operation 572). The imperial selects a particular node having a predicted idleness duration greater than or equal to the usage duration for the current tree. The imperial selects the particular node for executing the current tree. The imperial removes the particular node from the pending node group.

One or more embodiments including removing the current tree from the pending tree group (Operation 564). Since the current tree is now assigned, the imperial removes the current tree from the pending tree group.

One or more embodiments include determining whether the pending tree group includes at least one tree (Operation 566). Any trees in the pending tree group remain unassigned. Hence, the imperial determines whether the pending tree group includes at least one tree.

If the pending tree group includes no trees, one or more embodiments include deploying containers for the target transaction on the selected nodes (Operation 559). As described above, for each tree that is assigned to a node through iterations of Operation 562, the imperial deploys the corresponding container to the assigned node.

As an example, a target transaction may include Tree A, Tree B, Tree C. An imperial attempts to find a node group for Tree A, Tree B, Tree C. The attempt is unsuccessful. The imperial identifies Tree A as having the longest predicted runtime. Based on a step group from Tree A, the imperial selects Node A for executing Tree A. Next, the imperial attempts to find a node group for Tree B, Tree C. The attempt is unsuccessful. The imperial identifies Tree B as having the longest predicted runtime. Based on a step group from Tree B, the imperial selects Node B for executing Tree B. Next, the imperial attempts to find a node group for Tree C. The attempt is unsuccessful. The imperial identifies Tree C as having the longest predicted runtime. Based on a step group from Tree C, the imperial selects Node C for executing Tree C. Now, there are no more trees to assign. The imperial determines that the assignments determined through the iterations include: Tree A to Node A, Tree B to Node B, and Tree C to Node C. Hence, the imperial deploys a container corresponding to Tree A onto Node A, a container corresponding to Tree B onto Node B, and a container corresponding to Tree C onto Node C.

If the pending tree group includes at least one tree, one or more embodiments include determining whether the pending node group includes at least one node (Operation 568). Any trees remaining in the pending tree group still need to be assigned. The imperial determines whether the pending node group includes at least one node. If the pending node group includes at least one node, then there remains a possibility that any trees in the pending tree group can be assigned to the remaining nodes. Hence, the imperial iterates Operations 554. The imperial determines whether any nodes within the pending node group can serve as a node group for trees within the pending tree group. The imperial continues iterating the operations, until all trees are assigned a node (via either Operation 558 and/or Operation 562), or as further discussed below a failure to assign to a non-dedicated node is determined (via either Operation 568 and/or Operation 570).

In Scenario 4, dependency information is not specified and parallel execution information is not specified. One or more embodiments include determining that the target transaction of the first work group cannot be assigned to node of the second work group (Operation 574).

The target transaction of the first work group cannot be assigned to any node of the second work group where dependency information is not specified based on Operation 526 and parallel execution information is not specified based on Operation 528. Alternatively, the target transaction of the first work group cannot be assigned to any node of the second work group where dependency information is not specified based on Operation 526 and parallel execution information is specified based on Operation 528, but no node group is found based on Operation 530. Alternatively, the target transaction of the first work group cannot be assigned to any node of the second work group where dependency information is specified based on Operation 526 and parallel execution information is not specified based on Operation 536, but no step group including at least one skippable step is found based on Operations 544-546. information is specified based on Operation 528, but no node group is found based on Operation 530. Alternatively, the target transaction of the first work group cannot be assigned to any node of the second work group where dependency information is specified based on Operation 526 and parallel execution information is specified based on Operation 536, but no node group is found based on Operation 538, and no step group including at least one skippable step is found based on Operations 544-546.

One or more embodiments include waiting for assignment to a node of the first work group (Operation 576). The imperial waits for a dedicated node of the first work group to become available. The imperial may put the target transaction on a queue while waiting. A dedicated node becomes available when the available level of resources of the dedicated node is greater than or equal to the required level of resources for the target transaction. The imperial does not necessarily need any analysis on any predicted time window associated with the available level of resources of nodes. The imperial does not need, for example, a predicted duration in which an available level of resources will remain above a threshold value. As long as the node's available level of resources is determined to be sufficient at a certain time, the target transaction may be assigned to the node.

Operations 574-576 are executed when there is a failure to assign the target transaction of the first work group to a node of the second work group. Operations 574-576 are executed when Scenario 4 occurs, as described above. Additionally, Operations 574-576 are executed in Scenario 1, where a node group cannot be found at Operation 530. Additionally, Operations 574-576 are executed in Scenario 2, where a step group cannot be found at Operation 544, or where no skippable steps are identified within the step group at Operation 546. Additionally, Operations 574-576 are executed in Scenario 3, where the imperial cannot find a node having a predicted idleness duration sufficient for a tree from which a step group cannot be carved at Operation 570, or where all nodes are assigned a tree but at least one tree remains unassigned at Operations 566-568.

Figure 6:
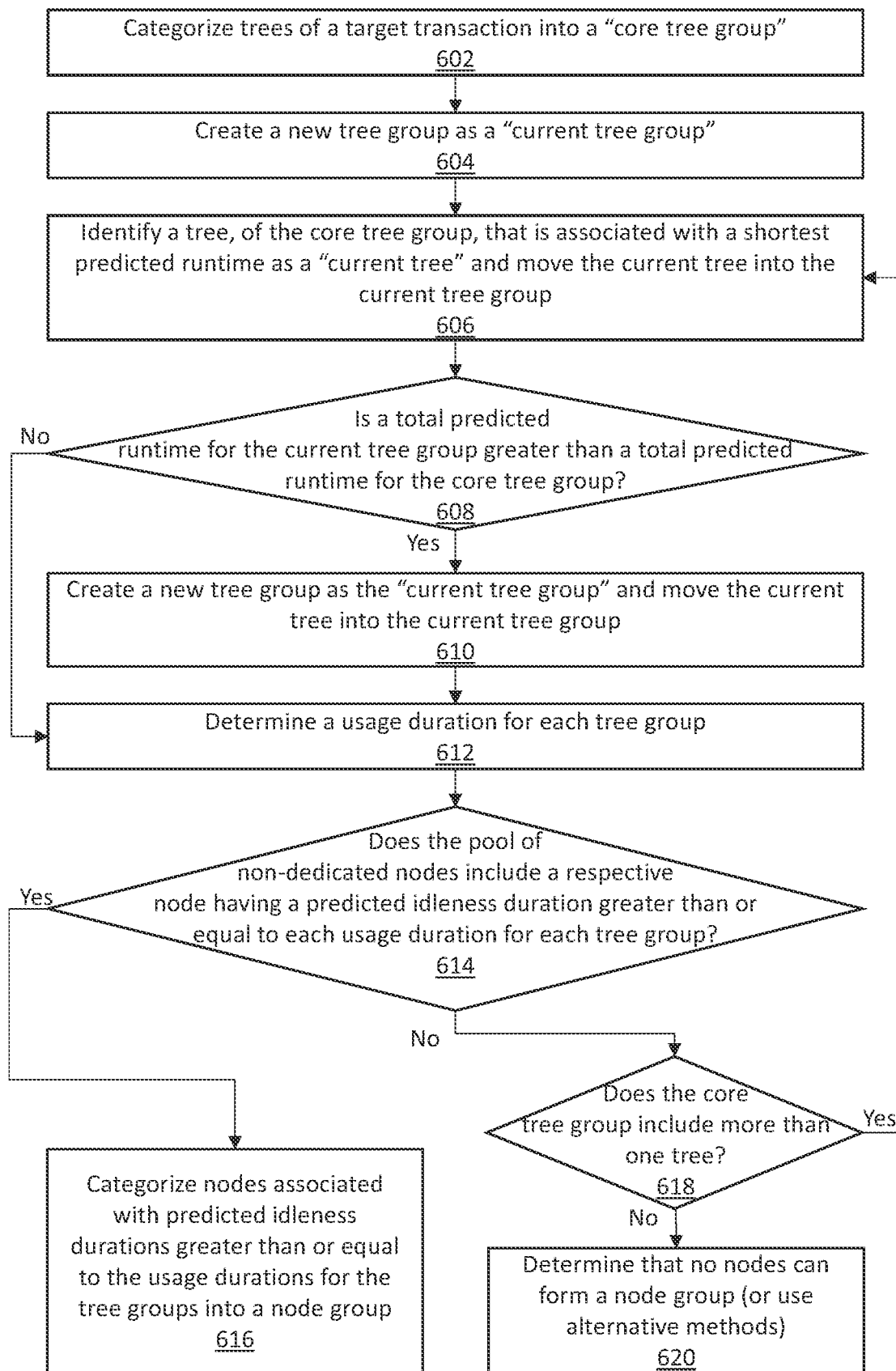
FIG. 6 illustrates an example set of operations for selecting nodes for executing trees of a transaction in accordance with one or more embodiments.

FIG. 6 illustrates an example set of operations for selecting nodes for executing trees of a transaction in accordance with one or more embodiments.

One or more embodiments include categorizing trees of a target transaction into a "core tree group" (Operation 602). An imperial identifies trees of a target transaction based on parallel execution information. The imperial categorizes the trees into a "core tree group."

One or more embodiments include creating a new tree group as a "current tree group" (Operation 604). The imperial creates a new tree group, which may be referred to as a "current tree group."

One or more embodiments include identifying a tree, of the core tree group, that is associated with a shortest predicted runtime as a "current tree" and moving the current tree into the current tree group (Operation 606). The imperial identifies a tree, of the core tree group, that is associated with a shortest predicted runtime. The identified tree may be referred to as a "current tree." The imperial moves the current tree from the core tree group to the current tree group.

One or more embodiments include determining whether a total predicted runtime for the current tree group is greater than a total predicted runtime for the core tree group (Operation 608). The imperial sums the predicted runtimes of the trees in the current tree group to determine a total predicted runtime for the current tree group. The imperial sums the predicted runtimes of the trees in the core tree group to determine a total predicted runtime for the core tree group. The imperial compares the total predicted runtime for the current tree group and the total predicted runtime for the core tree group.

If the total predicted runtime for the current tree group is greater than the total predicted runtime for the core tree group, one or more embodiments include creating yet another new tree group as the "current tree group" and moving the current tree into the current tree group (Operation 610). The imperial creates yet another new tree group, which is now referred to as the "current tree group." Any other existing tree groups are no longer the "current tree group." The imperial moves the current tree from the other tree group into the current tree group.

One or more embodiments include determining a usage duration for each tree group (Operation 612). The imperial identifies the existing tree groups, which includes the core tree group, the current tree group, and zero or more other tree groups. For each tree group, the imperial determines a usage duration based on the predicted runtimes of the associated trees and, optionally, a safety margin. In an embodiment, the usage duration for a tree group is a safety margin added to a sum of the predicted runtimes of the associated trees.

One or more embodiments include determining whether the pool of non-dedicated nodes includes a respective node having a predicted idleness duration greater than or equal to each usage duration for each tree group (Operation 614). The imperial selects a respective node for each tree group, wherein the selected node has a predicted idleness duration greater than or equal to the usage duration of the corresponding tree group. In an embodiment, the imperial traverses through the tree groups, from the tree group associated with the shortest predicted runtime to the tree group associated with the longest predicted runtime. For each tree group, the imperial selects a node that (a) has not yet been selected, and (b) is associated with the shortest predicted idleness duration that is greater than or equal to the currently-traversed tree group.

If the imperial successfully traverses through the tree groups and selects a respective node for each tree group, then the selected nodes form a node group. The pool of non-dedicated nodes does include a respective node having a predicted idleness duration greater than or equal to each usage duration for each tree group.

Otherwise, if at least one tree group cannot be matched with a node having a predicted idleness duration greater than or equal to a usage duration for the tree group, then the imperial determines that the attempt to find a node group is unsuccessful. The pool of non-dedicated nodes does not include a respective node having a predicted idleness duration greater than or equal to each usage duration for each tree group.

If the pool of non-dedicated nodes includes a respective node having a predicted idleness duration greater than or equal to each usage duration for each tree group, one or more embodiments include categorizing the nodes associated with the predicted idleness durations greater than or equal to the usage durations for the tree groups into a node group (Operation 616). The imperial identifies the nodes associated with predicted idleness durations greater than or equal to the usage durations for the tree groups. Hence, each tree group corresponds to a respective node, wherein a predicted idleness duration for each node is greater than or equal to a usage duration for a tree group corresponding to the node. The imperial categorizes the selected nodes into a node group.

If the pool of non-dedicated nodes does not include a respective node having a predicted idleness duration greater than or equal to each usage duration for each tree group, one or more embodiments include determining whether the core tree group includes more than one tree (Operation 618). The imperial determines a count of trees currently within the core tree group. The imperial determines whether the core tree group includes more than one tree.

If the core tree group includes more than one tree, then the core tree group may be further reduced in size. Hence, the imperial iterates Operations 606-614 to move another tree associated with a shortest predicted runtime from the core tree group to another tree group. The imperial continues moving trees from the core tree group, until a node group is found, or the core tree group includes a single tree.

If the core tree group includes one tree, one or more embodiments include determining that no nodes can form a node group (or using alternative methods to make additional attempts to form a node group) (Operation 620). The imperial determines that no nodes can form a node group.

Additionally or alternatively, the imperial may employ other methods to attempt to form a node group. As an example, a method similar to that illustrated in FIG. 6 may be employed; however, rather than moving a tree associated with a shortest predicted runtime at Operation 606, a tree of the core tree group associated with a longest predicted runtime is moved. As another example, after determining that the core tree group includes a single tree at Operation 618, an imperial may identify a tree group including a highest number of trees. The imperial may identify the tree group including the highest number of trees as a new "core tree group." Based on the tree groups formed thus far, and the new designation of the core tree group, the imperial may iterate the operations of FIG. 6. The imperial may move a tree, of the new core tree group, associated with a shortest predicted runtime to another tree group. If the imperial is still unsuccessful after executing available methods, the imperial determines that no nodes can form a node group.

An example is described below for purposes of clarity. Components and/or operations described below should be understood as a specific example which may not be applicable to certain embodiments. Accordingly, components and/or operations described below should not be construed as limiting the scope of any of the claims In an example, nodes of a computing network have the following predicted idleness durations within a time period of interest:
  Node A: 4 minutes;
  Node B: 5 minutes;
  Node C: 7 minutes;
  Node D: 9 minutes.

A target transaction may include 6 trees. The predicted runtimes of the trees may be as follows:
  Tree A: 3 minutes;
  Tree B: 3 minutes;
  Tree C: 2 minutes;
  Tree D: 4 minutes;
  Tree E: 2 minutes;
  Tree F: 4 minutes.

Initially, all 6 trees are categorized within Core Tree Group. The total predicted runtime of Core Tree Group is 18 minutes.

The imperial identifies Tree C as a tree within Core Tree Group associated with the shortest predicted runtime. The imperial moves Tree C into Tree Group I. Now, the total predicted runtime of Core Tree Group is 16 minutes, and the total predicted runtime of Tree Group I is 2 minutes. The imperial is unable to find nodes having predicted idleness durations greater than or equal to the total predicted runtimes for Core Tree Group and Tree Group I, respectively.

Next, the imperial identifies Tree E as a tree within Core Tree Group associated with the shortest predicted runtime. The imperial moves Tree E into Tree Group I. Now, Tree Group I includes Tree A, Tree C, and Core Tree Group includes Tree B, Tree D, Tree E, and Tree F. The total predicted runtime of Tree Group I is 5 minutes. The total predicted runtime of Core Tree Group is 13 minutes. The imperial is still unable to find nodes having predicted idleness durations greater than or equal to the total predicted runtimes for Core Tree Group and Tree Group I, respectively.

Next, the imperial identifies Tree A as a tree within Core Tree Group associated with the shortest predicted runtime. The imperial moves Tree A into Tree Group I. Now, Tree Group I includes Tree A, Tree C, Tree E, and Core Tree Group includes Tree B, Tree D, and Tree F. The total predicted runtime of Tree Group I is 7 minutes. The total predicted runtime of Core Tree Group is 11 minutes. The imperial is still unable to find nodes having predicted idleness durations greater than or equal to the total predicted runtimes for Core Tree Group and Tree Group I, respectively.

Next, the imperial identifies Tree B as a tree within Core Tree Group associated with the shortest predicted runtime. The imperial moves Tree B into Tree Group I. Now, Tree Group I includes Tree A, Tree B, Tree C, Tree E, and Core Tree Group includes Tree D, and Tree F. The total predicted runtime of Tree Group I is 10 minutes. The total predicted runtime of Core Tree Group is 8 minutes. The imperial determines that the total predicted runtime for Tree Group I is now greater than the total predicted runtime for Core Tree Group. Therefore the imperial creates a new Tree Group II. The imperial moves Tree B from Tree Group I to Tree Group II. Now, Tree Group II includes Tree B; Tree Group I includes Tree A, Tree C, Tree E; and Core Tree Group includes Tree D, and Tree F. The total predicted runtime of Tree Group II is 3 minutes. The total predicted runtime of Tree Group I is 7 minutes. The total predicted runtime of Core Tree Group is 8 minutes.

The imperial determines that the predicted idleness duration (9 minutes) for Node D is greater than or equal to the total predicted runtime (8 minutes) for Core Tree Group; the predicted idleness duration (7 minutes) for Node C is greater than or equal to the total predicted runtime (7 minutes) for Tree Group I; and the predicted idleness duration (5 minutes) for Node B is greater than or equal to the total predicted runtime (4 minutes) for Tree Group II. Therefore the imperial selects Node B, Node C, Node D as a node group. Node B corresponds to Tree Group II, Node C corresponds to Tree Group I, and Node D corresponds to Core Tree Group. Hence, the imperial assigns Tree B (of Tree Group II) to Node B; Tree A, Tree C, Tree E (of Tree Group I) to Node C; and Tree D, Tree F (of Core Tree Group) to Node D.

Figure 7:
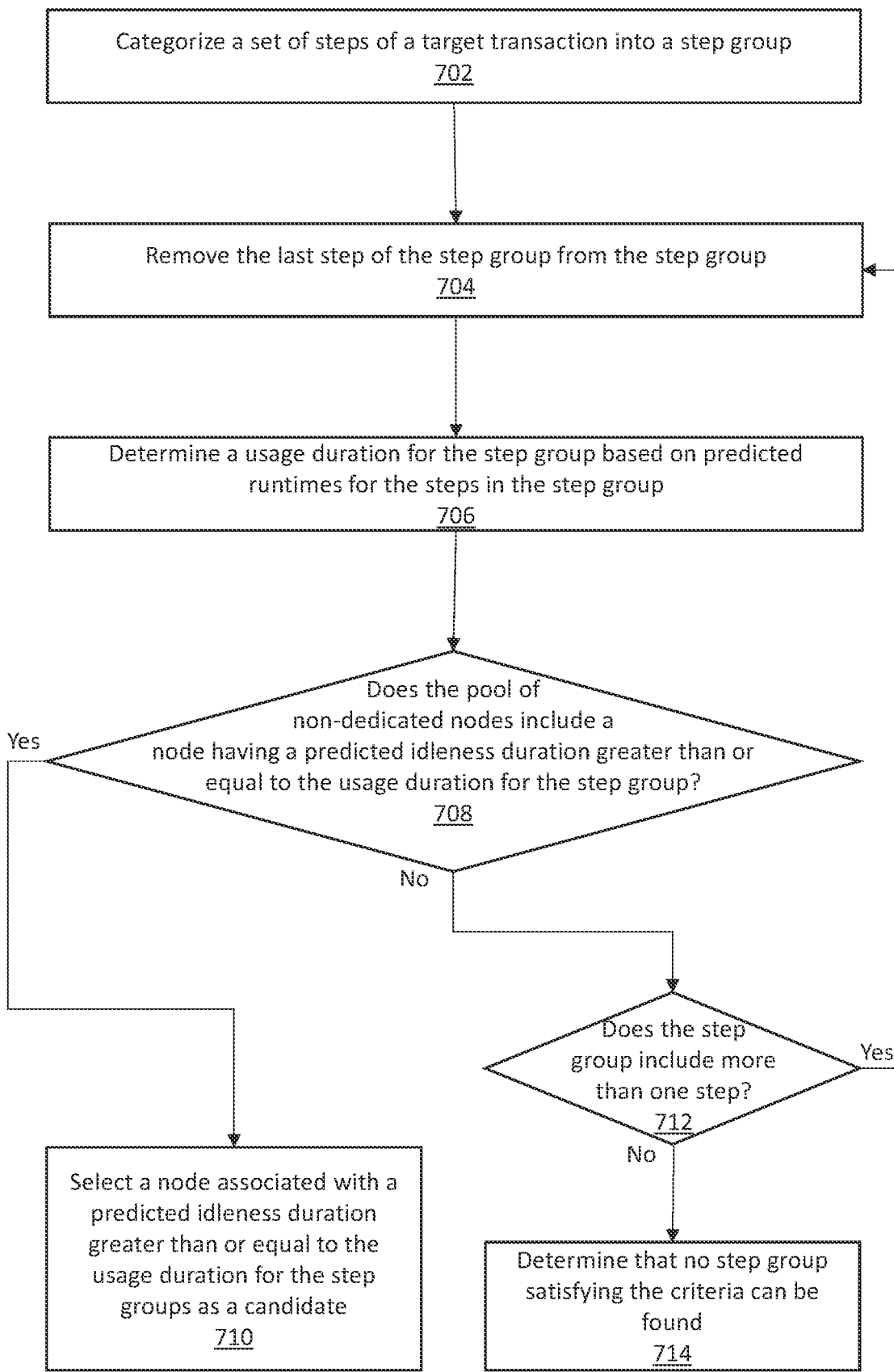
FIG. 7 illustrates an example set of operations for selecting a node for executing at least a subset of steps of a transaction in accordance with one or more embodiments.

FIG. 7 illustrates an example set of operations for selecting a node for executing at least a subset of steps of a transaction in accordance with one or more embodiments.

One or more embodiments include categorizing a set of steps of a target transaction into a step group (Operation 702). An imperial identifies steps of a target transaction. The imperial categorizes the steps into a step group.

One or more embodiments include removing the last step of the step group from the step group (Operation 704). The imperial identifies the last step of the step group. The imperial removes the last step from the step group.

One or more embodiments include determining a usage duration for the step group based on predicted runtimes for the steps in the step group (Operation 706). The imperial determines a usage duration for the step group based on predicted runtimes of the steps in the step group and, optionally, a safety margin. In an embodiment, the usage duration for a step group is a safety margin added to a sum of the predicted runtimes of the associated steps.

One or more embodiments include determining whether the pool of non-dedicated nodes includes a node having a predicted idleness duration greater than or equal to the usage duration for the step group (Operation 708). The imperial determines whether any non-dedicated node has a predicted idleness duration greater than or equal to the usage duration for the step group.

If a non-dedicated node has a predicted idleness duration greater than or equal to the usage duration for the step group, one or more embodiments include selecting the node as a candidate for executing at least the step group of the target transaction (Operation 710). The imperial identifies a node associated with a predicted idleness duration greater than or equal to the usage duration for the step group. The imperial selects the identified node as a candidate for executing at least the step group of the target transaction.

If no non-dedicated nodes have a predicted idleness duration greater than or equal to the usage duration for the step group, one ne or more embodiments include determining whether the step group includes more than one step (Operation 712). The imperial determines a count of steps in the step group. The imperial determines whether the step group includes more than one step.

If the step group includes more than one tree, then the step group may be further reduced in size. Hence, the imperial iterates Operations 704-708 to remove another step from the step group. The imperial continues removing steps from the end of the step group, until a non-dedicated node having a predicted idleness duration greater than or equal to a usage duration for the step group is found, or the step group includes a single step.

If the step group includes one step, one or more embodiments include determining that no step group satisfying the criteria can be found (Operation 714). The imperial determines no step group can be found, wherein the criteria for the step group requires that the predicted idleness duration of a node in the pool of non-dedicated nodes is greater than or equal to the usage duration for the step group.

An example is described below for purposes of clarity. Components and/or operations described below should be understood as a specific example which may not be applicable to certain embodiments. Accordingly, components and/or operations described below should not be construed as limiting the scope of any of the claims In an example, nodes of a computing network have the following predicted idleness durations within a time period of interest:

Node A: 4 minutes;
Node B: 5 minutes;
Node C: 8 minutes.

A target transaction may include 4 steps. The predicted runtimes of the steps may be as follows:

Step 1: 4 minutes;
Step 2: 3 minutes;
Step 3: 2 minutes;
Step 4: 4 minutes.

Initially, all 4 steps are categorized into a step group. The total predicted runtime of the step group is 13 minutes. No node has a predicted idleness duration greater than or equal to the predicted runtime for the step group.

Next, the imperial removes the last step, Step 4, from the step group. The imperial determines that the total predicted runtime of the step group is now 9 minutes. Still, no node has a predicted idleness duration greater than or equal to the predicted runtime for the step group.

Next, the imperial removes the last step, Step 3, from the step group. The imperial determines that the total predicted runtime of the step group is now 7 minutes. The imperial determines that a predicted idleness duration (8 minutes) for Node C is greater than or equal to the predicted runtime (7 minutes) for the step group. Therefore the imperial selects Node C as a candidate for executing at least Step 1 and Step 2 (within the step group).

Figure 8:
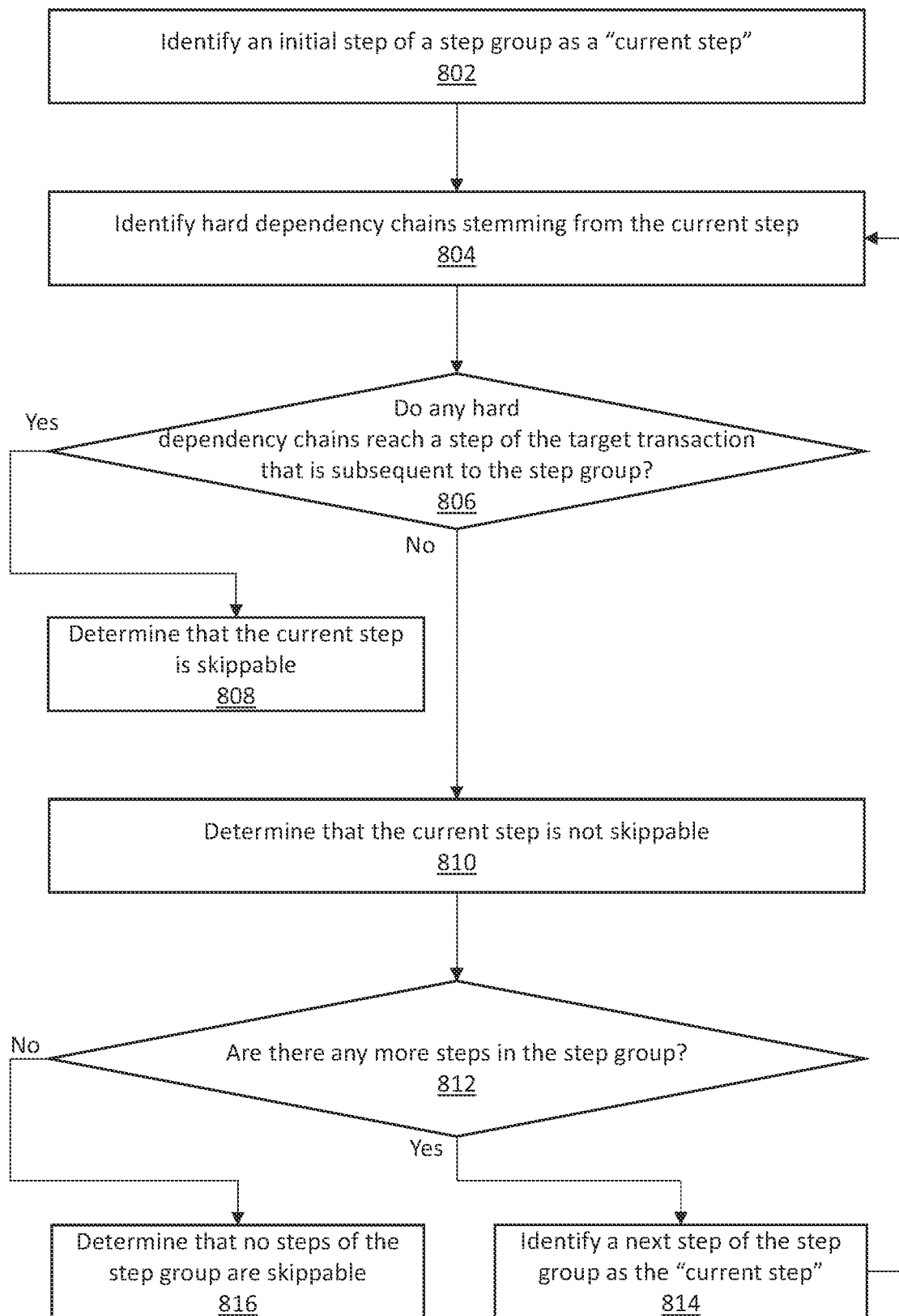
FIG. 8 illustrates an example set of operations for determining whether any steps, within at least a subset of steps of a transaction, are skippable in accordance with one or more embodiments.

FIG. 8 illustrates an example set of operations for determining whether any steps, within at least a subset of steps of a transaction, are skippable in accordance with one or more embodiments.

One or more embodiments include identifying an initial step of a step group as a "current step" (Operation 802). An imperial identifies an initial step of a step group as a "current step."

One or more embodiments include identifying hard dependency chains stemming from the current step (Operation 804). The imperial identifies hard dependencies associated with the steps of the target transaction. The imperial determines a transitive closure of the hard dependencies.

Given that a hard dependency stems from the current step to another step, the other step may be referred to as a "dependent step" with respect to the hard dependency. In an embodiment, the imperial initially begins with the current step and identifies dependent steps with respect to the current step. The imperial iteratively identifies dependent steps for each previously-identified step. When no additional dependent steps are found, a transitive closure is determined. Each identified step is reachable via a hard dependency chain stemming from the current step.

Referring to FIG. 4, as an example, an imperial may begin with step 406*a*. The imperial identifies any dependent steps with respect to step 406*a*. The imperial determines that the dependent steps include step 406*c*. The imperial iteratively identifies any dependent steps with respect to step 406*c*. The imperial determines that the dependent steps include step 406*d*. The imperial iteratively identifies any dependent steps with respect to step 406*d*. The imperial determines that there are no dependent steps with respect to step 406*d*. Hence, the imperial has determined a transitive closure of hard dependencies stemming from step 406*a*. The identified steps include step 406*c* and 406*d*. Therefore, a hard dependency chain stemming from step 406*a* reaches steps 406*c*, 406*d*.

One or more embodiments include determining whether any hard dependency chains reach a step of the target transaction that is subsequent to the step group (Operation 806). The imperial identifies a last step of the step group. The imperial determines whether a hard dependency chain from the current step reaches a step after the last step of the step group.

Referring to FIG. 4, in an example, a step group may include steps 406*a-d*. An imperial may determine that a farthest step reachable via a hard dependency chain from step 406*a* is step 406*d*. Since the last step of the step group is step 406d, the imperial may determine that no hard dependency chains reach a step that is subsequent to the step group.

Referring again to FIG. 4, in another example, a step group may include steps 406a-c. An imperial may determine that a farthest step reachable via a hard dependency chain from step 406a is step 406d. Since the last step of the step group is step 406c, the imperial may determine that there is a hard dependency chain reaching a step (step 406d) that is subsequent to the step group.

If no hard dependency chains reach a step of the target transaction that is subsequent to the step group, one or more embodiments include determining that the current step is skippable (Operation 808). The imperial determines that the current step is skippable.

If a node having a predicted idleness duration sufficient for executing the step group is assigned to the target transaction, and the execution of the target transaction is indeed interrupted subsequent to executing the step group, then upon resumption of the target transaction, any skippable steps within the executed step group need not be re-executed.

Referring to FIG. 4, in an example, a step group may include steps 406a-d of the target transaction 400. As described above, step 406a is identified as a skippable step within the step group.

Continuing the example, a node having a predicted idleness duration sufficient for the step group may be assigned to the target transaction 400. The execution of the target transaction 400 on the node may be interrupted after completion of step 406d but before completion of step 406e. Subsequently, execution of the target transaction 400 is resumed. Since step 406e has not been completed during the first execution, step 406e is identified as a step needing execution during the resumption. Step 406e has a hard dependency on step 406b; therefore step 406b needs to be re-executed during the resumption. However step 406e does not have any direct or indirect hard dependencies on step 406d, step 406c, or step 406a. Therefore, steps 406a, 406c, 406d need not be re-executed during the resumption. Hence, the fact that step 406a need not be re-executed during resumption is consistent with the previous finding that step 406a is a skippable step within the step group.

If a hard dependency chain reaches a step of the target transaction that is subsequent to the step group, one or more embodiments include determining that the current step is not skippable (Operation 810). The imperial determines the current step is not skippable.

One or more embodiments include determining whether there are any more steps in the step group (Operation 812). The imperial determines any steps in the step group have not yet been traversed.

If at least one step of the step group has not yet been traversed, one or more embodiments include identifying a next step of the step group as the "current step" (Operation 814). The imperial identifies a next step of the step group as the "current step."

The imperial iterates Operations 804-812 with respect to the new current step. The imperial has traverses through each step of the step group, until a skippable step is found, or there are no more steps in the step group to traverse.

If there are no more steps in the step group to traverse, one or more embodiments include determining that no steps of the step group are skippable (Operation 816). The imperial determines that no steps of the step group are skippable.

6. Handling an Interruption on a Non-Dedicated Node

Figure 9:
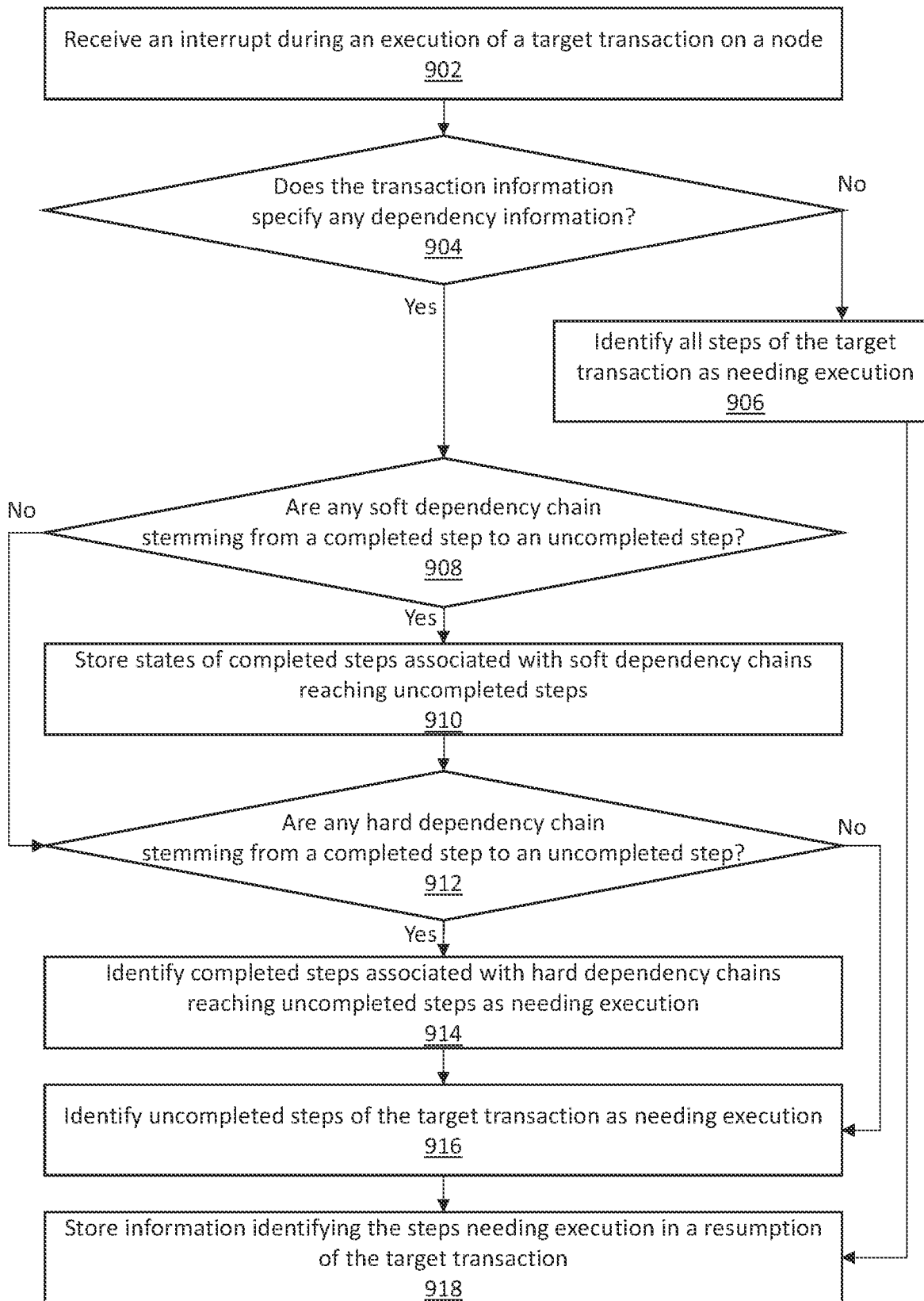
FIG. 9 illustrates an example set of operations for handling an interruption of an execution of a transaction on a non-dedicated node in accordance with one or more embodiments.

FIG. 9 illustrates an example set of operations for handling an interruption of an execution of a transaction on a non-dedicated node in accordance with one or more embodiments. One or more operations illustrated in FIG. 9 may be modified, rearranged, or omitted all together. Accordingly, the particular sequence of operations illustrated in FIG. 9 should not be construed as limiting the scope of one or more embodiments.

One or more embodiments include receiving an interrupt during an execution of a target transaction on a node (Operation 902). While a node of a particular work group is executing a target transaction of a different work group, the node and/or an imperial receives a notification that a request for execution of a transaction of the particular work group has been received. The request for execution of the transaction of the particular work group on the node of the particular work group causes an interrupt to the execution of the target transaction. Additional and/or alternative events may also cause an interrupt to the execution of the target transaction. The imperial receives the interrupt during execution of the target transaction on the non-dedicated node.

Steps of the target transaction that have been completed prior to receipt of the interrupt may be referred to as "completed steps." Steps of the target transaction that have not been completed prior to receipt of the interrupt (execution has not started, or execution has started but has not completed) may be referred to as "uncompleted steps."

One or more embodiments include determining whether the transaction information specifies any dependency information (Operation 904). The imperial obtains transaction information for the target transaction. The imperial determines whether the transaction information specifies any dependency information.

If no dependency information is specified, one or more embodiments include identifying all steps of the target transaction as needing execution in a resumption of the target transaction (Operation 906). Since there is no dependency information to take advantage of, the imperial identifies all steps of the target transaction as needing execution in a resumption of the target transaction.

If dependency information is specified, one or more embodiments include determining whether any soft dependency chains stem from a completed step to an uncompleted step (Operation 908).

In an embodiment, the imperial iterates through each completed step. The imperial identifies soft dependency chains stemming from a completed step. The imperial determines whether any of the soft dependency chains reach an uncompleted step.

In another embodiment, the imperial iterates through each uncompleted step. The imperial identifies soft dependency chains reaching an uncompleted step. The imperial determines whether any of the soft dependency chains originate from a completed step.

One or more embodiments include storing states of completed steps associated with soft dependency chains reaching uncompleted steps (Operation 910). The imperial stores states resulting from completed steps associated with soft dependency chains reaching uncompleted steps. The states may be stored in a container corresponding to the target transaction. Additionally or alternatively, the states may be stored in any data repository directly or indirectly accessible to a future node that resumes execution of the target transaction. A state resulting from a completed step may include, for example: outputs generated by the step; values, metadata, and/or attributes associated with data objects affected by the step; and/or other metadata affected by the step. The stored states of completed steps may be used in a resumption of the target transaction.

As an example, a first execution of a target transaction may be interrupted. An uncompleted step may have a soft dependency on a completed step. A state resulting from completed step is stored. The state may be stored in a container corresponding to the target transaction. In a resumption of the target transaction, rather than re-executing the completed step, the stored state is loaded and restored. The uncompleted step may rely on the restored state.

One or more embodiments include determining whether any hard dependency chains stem from a completed step to an uncompleted step (Operation 912).

In an embodiment, the imperial iterates through each completed step. The imperial identifies hard dependency chains stemming from a completed step. The imperial determines whether any of the hard dependency chains reach an uncompleted step.

In another embodiment, the imperial iterates through each uncompleted step. The imperial identifies hard dependency chains reaching an uncompleted step. The imperial determines whether any of the hard dependency chains originate from a completed step.

One or more embodiments include identifying completed steps associated with hard dependency chains reaching uncompleted steps as needing execution in a resumption of the target transaction (Operation 914). The imperial identifies completed steps associated with hard dependency chains reaching uncompleted steps. The imperial identifies the completed steps as steps needing execution in a resumption of the target transaction.

One or more embodiments include identifying uncompleted steps of the target transaction as needing execution in a resumption of the target transaction (Operation 916). The imperial identifies uncompleted steps as needing execution in a resumption of the target transaction.

One or more embodiments include storing information identifying the steps needing execution in a resumption of the target transaction (Operation 918). The imperial stores information identifying the steps needing execution in a resumption of the target transaction (the steps needing execution are identified at Operations 906, 914, and/or 916). The imperial stores the information in a container corresponding to the target transaction.

In an embodiment, the imperial packages the steps needing execution as a new transaction to be executed. Hence, operations for selecting a node as illustrated in FIGS. 5A-5G may be executed with respect to the new transaction.

In an embodiment, the imperial updates the container corresponding to the target transaction. The imperial modifies the transaction information stored in the container to delete or remove any steps that need not be executed. Additionally or alternatively, the imperial modifies the transaction information stored in the container to mark any steps that need not be executed as not needing execution.

The imperial generates a request to resume execution of the target transaction. The request may include or reference information specifying the steps needing execution. The imperial executes the operations of FIGS. 5A-5G to select a node for resuming execution of the target transaction, based on the steps that need execution. Steps that do not need execution are not factored into predicted runtimes for the target transaction, a tree group, and/or a step group.

When executing the operations of FIGS. 5A-5G in a resumption of the target transaction, the imperial may perform a new execution of Operations 512-516.

At Operation 512, the imperial determines a predicted runtime for the steps needing execution in resumption, without necessarily determining a predicted runtime for the entire target transaction. Additionally or alternatively, the imperial determines a predicted runtime for each step needing execution in resumption, without necessarily determining a predicted runtime for each step of the entire target transaction. To determine updated predicted runtimes during a resumption of the target transaction, the imperial applies a runtime prediction model, which may have been updated since the last use of the runtime prediction model in an initial execution of the target transaction.

At Operation 514, the imperial determines a usage duration for the steps needing execution in resumption, without necessarily determining a usage duration for the entire target transaction. Hence, steps that were completed in an initial execution and do not need re-execution are not necessarily included in the usage duration.

At Operation 516, the imperial determines a predicted idleness duration for each of the pool of non-dedicated nodes. The imperial identifies a new time period of interest. The new time period of interest starts from the current time, which may be, for example, the time at which resumption of the target transaction is requested. To determine updated predicted idleness durations during a resumption of the target transaction, the imperial applies an idleness duration prediction model, which may have been updated since the last use of the idleness duration prediction model in an initial execution of the target transaction.

The imperial uses updated predicted runtimes and updated predicted idleness durations to select a node, from a pool of non-dedicated nodes, for resuming the target transaction.

An example is described below for purposes of clarity. Components and/or operations described below should be understood as a specific example which may not be applicable to certain embodiments. Accordingly, components and/or operations described below should not be construed as limiting the scope of any of the claims Referring to FIG. 4, in an example, a non-dedicated node begins execution of the target transaction 400. The execution is interrupted after step 406d is complete but before step 406e is complete.

An imperial determines whether any soft dependency chains stem from a completed step to an uncompleted step. A soft dependency chain runs from step 406b to step 406c. However, since both steps 406b, 406c are completed, the imperial does not identify the soft dependency chain as stemming from a completed step to an uncompleted step. Another soft dependency chain runs from step 406a to step 406e. The imperial does identify the soft dependency chain as stemming from a completed step to an uncompleted step.

The imperial stores states resulting from the completion of step 406a. The imperial stores the states in a container corresponding to the target transaction 400.

The imperial determines whether any hard dependency chains stem from a completed step to an uncompleted step. A hard dependency chain runs from step 406a to step 406c to step 406d. However, since steps 406a, 406c, 406d are completed, the imperial does not identify the hard dependency chain as stemming from a completed step to an uncompleted step. Another soft dependency chain runs from step 406b to step 406e. The imperial does identify the hard dependency chain as stemming from a completed step to an uncompleted step.

Since step 406*b* is a completed step associated with a hard dependency chain reaching an uncompleted step, the imperial identifies step 406*b* as needing execution in a resumption of the target transaction. Additionally, since step 406*e* is uncompleted, the imperial identifies step 406*e* as needing execution in a resumption of the target transaction.

The imperial stores information identifying steps 406*b*, 406*e* as needing execution in a resumption of the target transaction. The information may be stored in the container corresponding to the target transaction.

In a resumption of the target transaction, the imperial deploys the container corresponding to the target transaction on a particular node. The node executes the steps needing execution, as identified by the information stored in the container. The steps needing execution include steps 406*b*, 406*e*. Even though step 406*e* has a soft dependency on step 406*a*, step 406*a* need not be executed during the resumption of the target transaction. Rather the node restores the states resulting from the completion of step 406*a* during the previous execution of the target transaction. The node uses the restored states during the execution of step 406*e*. Using the restored state from a previous execution of step 406*a*, without re-executing step 406*a* during the resumption of the target transaction, may be referred to as a "ghost execution" of step 406*a*.

7. Modifying Prediction Configurations

Figure 10:
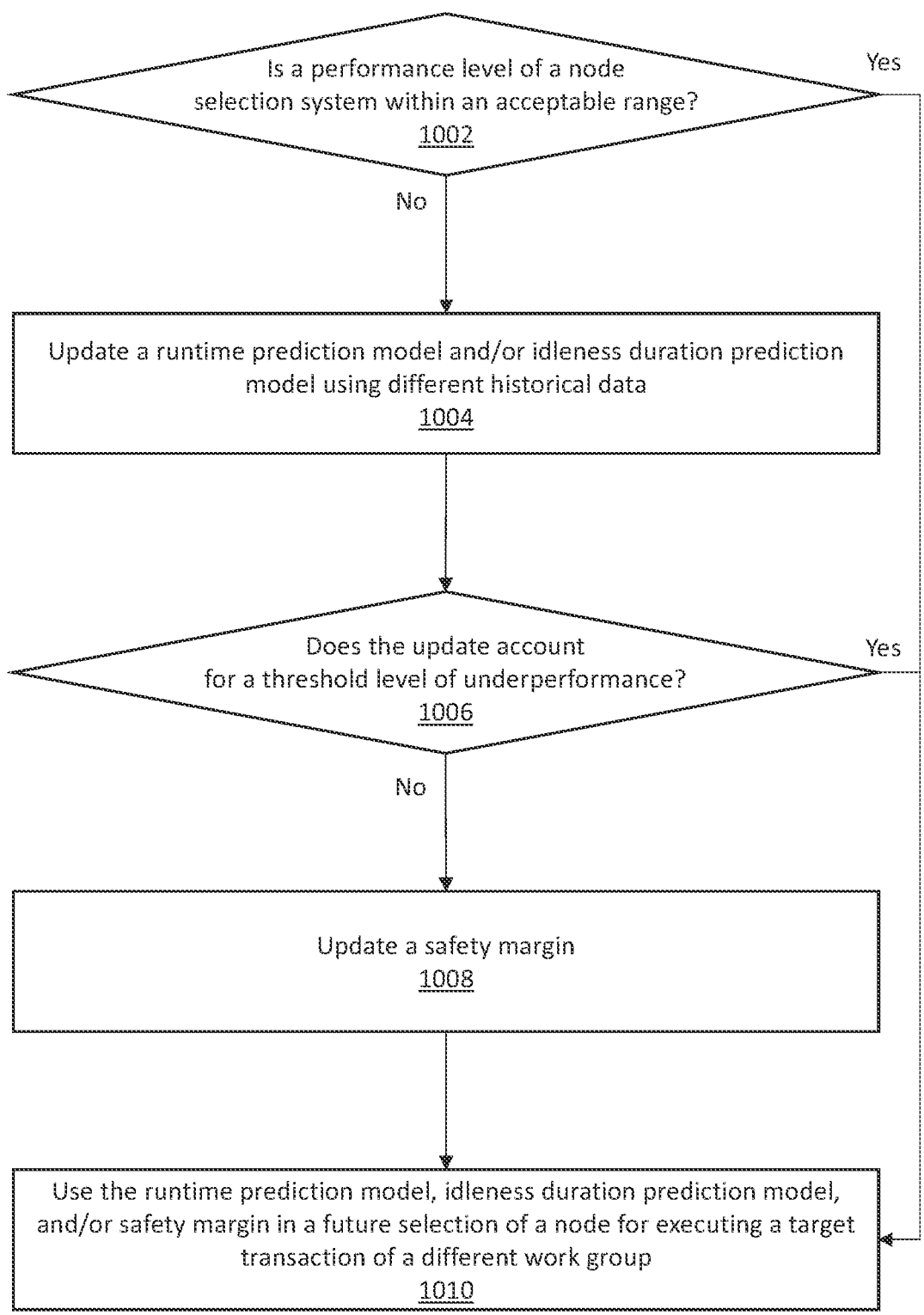
FIG. 10 illustrates an example set of operations for modifying prediction configurations used for selecting a node for executing a target transaction in accordance with one or more embodiments.

FIG. 10 illustrates an example set of operations for modifying prediction configurations used for selecting a node for executing a target transaction in accordance with one or more embodiments. One or more operations illustrated in FIG. 10 may be modified, rearranged, or omitted all together. Accordingly, the particular sequence of operations illustrated in FIG. 10 should not be construed as limiting the scope of one or more embodiments.

One or more embodiments include determining whether a performance level of a node selection system is within an acceptable range (Operation 1002). An imperial monitors a performance level of a node selection system. Performance level may be measured by, for example, accuracy rate of runtime predictions, accuracy rate of idleness duration predictions, and/or rate and/or frequency of interrupts to transactions executing on non-dedicated nodes.

In an embodiment, the imperial records, for each transaction, predicted runtimes and actual runtimes. The predicted runtimes may be determined using a runtime prediction model. The imperial determines an accuracy rate of runtime predictions based on a difference a predicted runtime and an actual runtime for a transaction. The imperial determines whether the accuracy rate is within an acceptable range.

In an embodiment, the imperial records, for each idleness window, predicted idleness durations and actual idleness durations. The predicted idleness durations may be determined using an idleness duration prediction model. The imperial determines an accuracy rate of idleness duration predictions based on a difference a predicted idleness duration and an actual idleness duration for an idleness window. The imperial determines whether the accuracy rate is within an acceptable range.

In an embodiment, the imperial records, for each node, predicted node usage and actual node usage. The predicted node usage may be determined using an idleness duration prediction model. The imperial determines an accuracy rate of node usage predictions based on a difference predicted node usage and actual node usage over a particular time period. The imperial determines whether the accuracy rate is within an acceptable range.

In an embodiment, the imperial records each interruption of an execution of a transaction on a non-dedicated node and/or each successful completion of an execution of a transaction on a non-dedicated node. Additionally or alternatively, the imperial records and/or determines a total number of executions of transactions on non-dedicated nodes. The imperial divides the number of interruptions of executions of transactions on non-dedicated nodes over a particular time period by the total number of executions of transactions on non-dedicated nodes over the particular time period. The quotient may be referred to as an "interruption rate." The imperial divides the number of completions of executions of transactions on non-dedicated nodes over a particular time period by the total number of executions of transactions on non-dedicated nodes over the particular time period. The quotient may be referred to as a completion rate. The imperial divides the number of interruptions of executions of transactions on non-dedicated nodes over a particular time period by the duration of the particular time period. The quotient may be referred to as an "interruption frequency." The imperial divides the number of completions of executions of transactions on non-dedicated nodes over a particular time period by the duration of the particular time period. The quotient may be referred to as a "completion frequency." The imperial may determine additional and/or alternative performance metrics. The imperial determines whether the interruption rate, the completion rate, the interruption frequency, the completion frequency, and/or other performance metrics are within an acceptable range.

In an embodiment, the imperial computes an overall performance score for the node selection system based on the above-described metrics, such as accuracy rate of runtime predictions, accuracy rate of idleness duration predictions, and/or rate and/or frequency of interrupts to transactions executing on non-dedicated nodes. The imperial may apply different weights to different metrics when computing the overall performance score. The imperial determines whether the overall performance score is within an acceptable range.

One or more embodiments include updating a runtime prediction model and/or idleness duration prediction model using different historical data (Operation 1004). The imperial updates a training set used for training the runtime prediction model and/or idleness duration prediction model. The imperial may obtain runtime data and/or node usage data over a historical time window ending with the current time. The imperial may use the most recent historical data as the training set. The imperial iterates one or more machine learning algorithms using the updated training set to obtain an updated runtime prediction model and/or idleness duration prediction model.

One or more embodiments include determining whether the update accounts for a threshold level of underperformance (Operation 1006). The imperial obtains data that was applied to the previous runtime prediction model and/or idleness duration prediction model to obtain the predictions that are deemed underperformance. The imperial inputs the past data into the updated runtime prediction model and/or idleness duration prediction model to obtain new predictions. The imperial determines whether the new predicted runtimes and/or predicted idleness durations are within an acceptable range of the actual runtimes and/or actual idleness durations. If the new predictions are within an acceptable range, the imperial determines that the update accounts for a threshold level of underperformance. Otherwise, if the new predictions are not within the acceptable range, the imperial determines that the update does not account for the threshold level of underperformance.

One or more embodiments include updating a safety margin (Operation 1008). The imperial increases the safety margin. The increase to the safety margin may, for example, be an addend to the existing safety margin and/or a multiplier applied to the existing safety margin. The increase to the safety margin may be determined based on a difference between the performance level of the node selection system and the acceptable threshold value. Alternatively, the increase to the safety margin may be a fixed incremental value.

One or more embodiments include using the runtime prediction model, idleness duration prediction model, and/or safety margin in a future selection of a node for executing a target transaction of a different work group (Operation 1010). The imperial uses the runtime prediction model, idleness duration prediction model, and/or safety margin (which may have been updated based on Operations 1004, 1008) in a future selection of a node for executing a target transaction of a different work group.

8. Managing Work Group Credit

Figure 11:
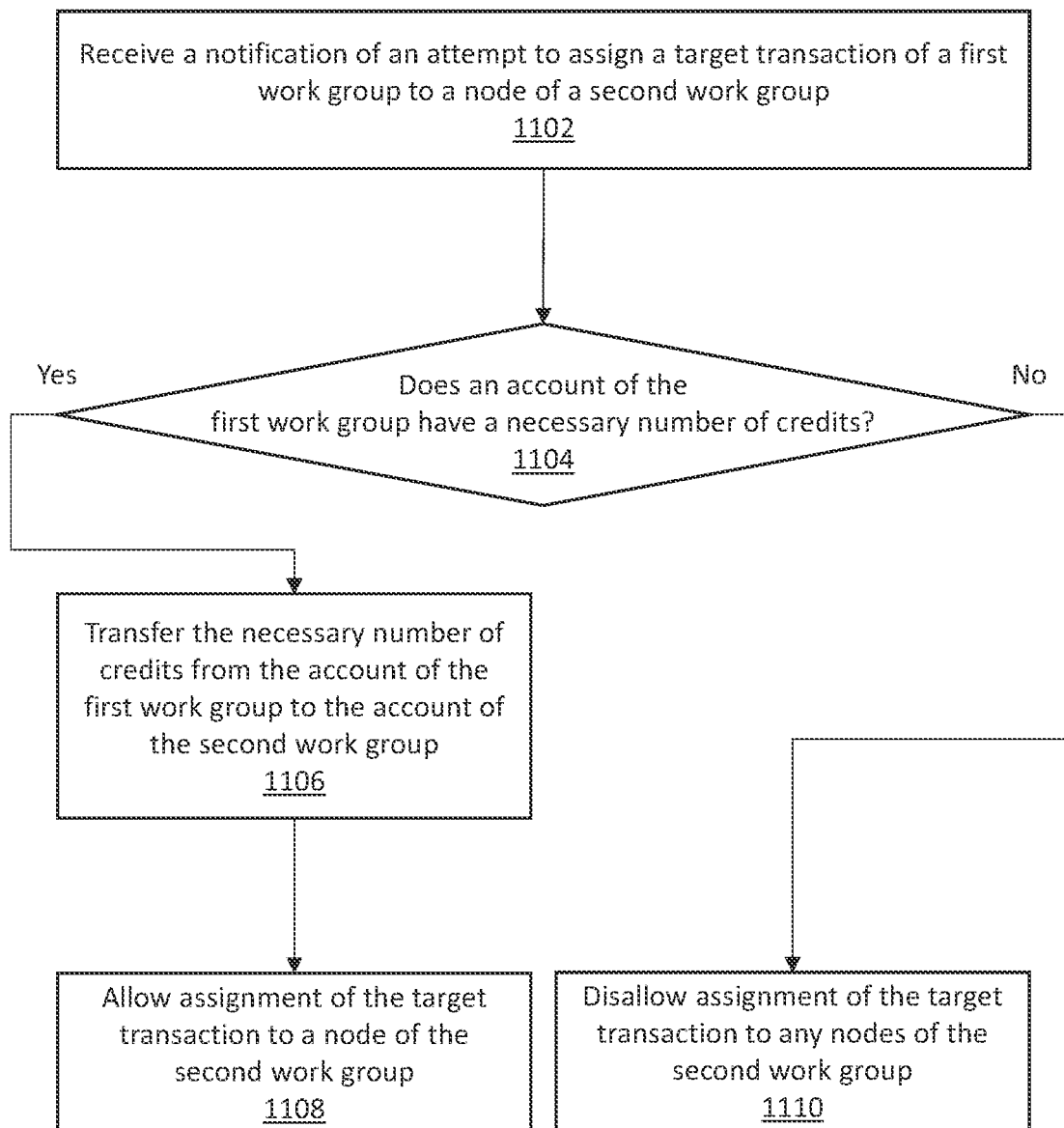
FIG. 11 illustrates an example set of operations for managing work group credits associated with using non-dedicated nodes in accordance with one or more embodiments.

FIG. 11 illustrates an example set of operations for managing work group credits associated with using non-dedicated nodes in accordance with one or more embodiments. One or more operations illustrated in FIG. 11 may be modified, rearranged, or omitted all together. Accordingly, the particular sequence of operations illustrated in FIG. 11 should not be construed as limiting the scope of one or more embodiments.

One or more embodiments include receiving a notification of an attempt to assign a target transaction of a first work group to a node of a second work group (Operation 1102). A credit manager receives a notification of an attempt to assign a target transaction of a first work group to a node of a second work group. The notification may be received from an imperial and/or a client requesting the target transaction.

One or more embodiments include determining whether the account of the first work group has a necessary number of credits for borrowing a node of the second work group (Operation 1104). The credit manager retrieves a balance of the account of the first work group from a data repository.

The credit manager determines a requisite number of credits required for executing the target transaction on a node of the second work group. In an embodiment, a fixed requisite number of credits is required for each transaction, regardless of transaction type and/or work group. In another embodiment, the requisite number of credits may be determined based on various factors. The requisite number of credits may be determined based on attributes associated with the target transaction, such as, a predicted runtime of the target transaction, a level of resources required for executing the target transaction, a complexity of the target transaction. The requisite number of credits may be determined based on attributes associated with nodes of the second work group, such as, a capacity and/or quality of the nodes, and/or a configuration set by administrators of the second work group. The requisite number of credits may be determined based on other factors, such as, the frequency at which transactions of the first work group are executed on nodes of other work groups during a particular time period.

The credit manager compares the account balance of the first work group and the requisite number of credits associated with the target transaction. The credit manager determines whether the number of credits in the account is greater than or equal to the requisite number of credits associated with the target transaction.

If the account of the first work group does not have sufficient credits, one or more embodiments include disallowing assignment of the target transaction to any nodes of the second work group (Operation 1110). The credit manager disallows assignment of the target transaction to any nodes of the second work group. The credit manager may transmit a message to the imperial indicating that the target transaction cannot be assigned to any nodes of the second work group. The imperial may attempt to assign the target transaction to a node of the first work group. Additionally or alternatively, the imperial may attempt to assign the target transaction to a node of yet another work group. If the imperial attempts to assign the target transaction to a node of a third work group, the credit manager may iterate operations of FIG. 11 to determine whether the account of the first work group has sufficient credits for borrowing a node from the third work group.

If the account of the first work group has sufficient credits, one or more embodiments include transferring the necessary number of credits from the account of the first work group to the account of the second work group (Operation 1106). The credit manager deducts the requisite number of credits from the account of the first work group. The credit manager adds the requisite number of credits to the account of the second work group.

One or more embodiments include allowing assignment of the target transaction to a node of the second work group (Operation 1108). The credit manager allows assignment of the target transaction to a node of the second work group. The credit manager may transmit a message to the imperial indicating that the target transaction may be assigned to one or more nodes of the second work group. The imperial executes operations illustrated in FIGS. 5A-5G to attempt to assign the target transaction to one or more nodes of the second work group.

9. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

10. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 12:
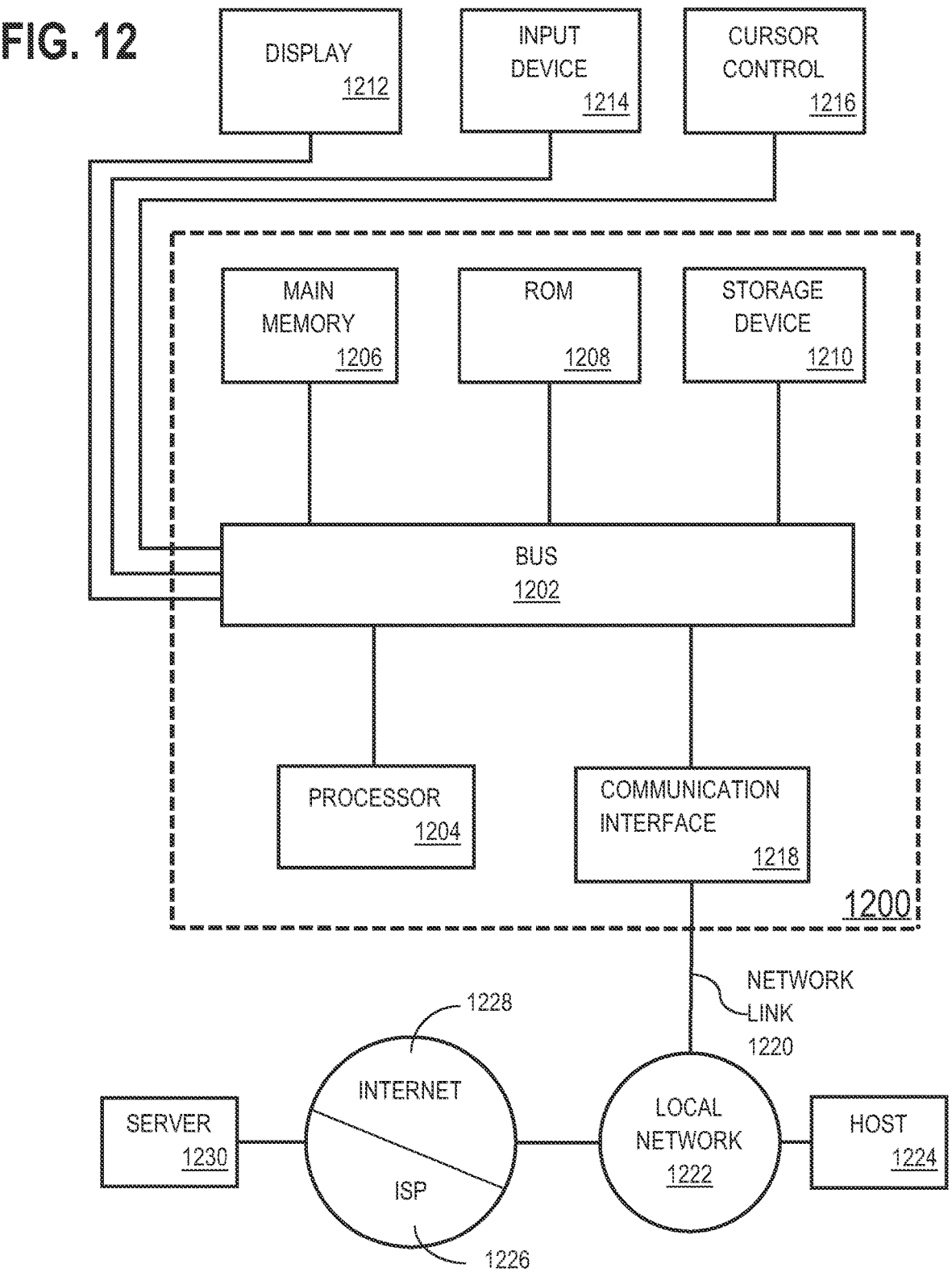
FIG. 12 shows a block diagram that illustrates a computer system in accordance with one or more embodiments.

For example, FIG. 12 is a block diagram that illustrates a computer system 1200 upon which an embodiment of the invention may be implemented. Computer system 1200 includes a bus 1202 or other communication mechanism for communicating information, and a hardware processor 1204 coupled with bus 1202 for processing information. Hardware processor 1204 may be, for example, a general purpose microprocessor.

Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Such instructions, when stored in non-transitory storage media accessible to processor 1204, render computer system 1200 into a special-purpose machine that is customized to perform the operations specified in the instructions.

Computer system 1200 further includes a read only memory (ROM) 1208 or other static storage device coupled to bus 1202 for storing static information and instructions for processor 1204. A storage device 1210, such as a magnetic disk or optical disk, is provided and coupled to bus 1202 for storing information and instructions.

Computer system 1200 may be coupled via bus 1202 to a display 1212, such as a cathode ray tube (CRT), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

Computer system 1200 may implement the techniques described herein using customized hard-wired logic, one or more ASICs or FPGAs, firmware and/or program logic which in combination with the computer system causes or programs computer system 1200 to be a special-purpose machine. According to one embodiment, the techniques herein are performed by computer system 1200 in response to processor 1204 executing one or more sequences of one or more instructions contained in main memory 1206. Such instructions may be read into main memory 1206 from another storage medium, such as storage device 1210. Execution of the sequences of instructions contained in main memory 1206 causes processor 1204 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1210. Volatile media includes dynamic memory, such as main memory 1206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 1202. Transmission media can also take the form of acoustic or light waves, such as those generated during radio-wave and infra-red data communications.

Various forms of media may be involved in carrying one or more sequences of one or more instructions to processor 1204 for execution. For example, the instructions may initially be carried on a magnetic disk or solid state drive of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card, cable modem, satellite modem, or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are example forms of transmission media.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218.

The received code may be executed by processor 1204 as it is received, and/or stored in storage device 1210, or other non-volatile storage for later execution.

10. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer readable media storing instructions which, when executed by one or more hardware processors, cause:

identifying a plurality of nodes associated with a first work group of a plurality of work groups;

wherein transactions associated with the first work group have priority over transactions associated with a second work group of the plurality of work groups to the plurality of nodes, and transactions associated with the second work group have priority over transactions associated with the first work group to a second plurality of nodes associated with the second work group;

obtaining a set of predicted idleness durations corresponding to the plurality of nodes over a particular time period based at least on historical usage data of the plurality of nodes over a historical time period;

wherein a predicted idleness duration for a particular node of the plurality of nodes corresponds to a time window during which the particular node is predicted to be associated with a node usage by the first work group that is below a threshold value, and the node usage by the first work group is determined based on one or more of a compute usage by the first work group and a memory usage by the first work group;

identifying a target transaction associated with the second work group, the target transaction comprising a plurality of steps comprising a first step and a second step;

wherein the second step is associated with a hard dependency on the first step such that an interruption of the target transaction after completion of the first step and before completion of the second step would require re-execution of the first step; obtaining a set of predicted runtimes corresponding to the plurality of steps of the target transaction based at least on historical runtimes for steps of transactions associated with a common set of characteristics as the target transaction;

determining that the predicted idleness duration for the particular node is greater than or equal to a usage duration associated with a step group;

wherein the step group consists of a subset of the plurality of steps, and the usage duration is determined based on a subset of the set of predicted runtimes corresponding to the subset of the plurality of steps;

determining whether any step of the step group is skippable in a resumption of the target transaction in case a first execution of the target transaction is interrupted subsequent to completion of the subset of the plurality of steps but prior to completion of the target transaction, wherein determining that no steps of the step group is skippable comprises:

identifying a hard dependency chain stemming from a particular step of the step group;

determining whether the hard dependency chain reaches any step of the plurality of steps that is subsequent to the step group; and determining that the particular step is not skippable in response to determining that the hard dependency chain reaches a step of the plurality of steps that is subsequent to the step group;

responsive at least to determining that no steps of the step group is skippable:
  refraining from selecting any of the plurality of nodes for executing the target transaction;
  determining that the target transaction cannot use any of the first plurality of nodes;
  assigning the target transaction to one or more of the second plurality of nodes; and
  executing the target transaction on the one or more of the second plurality of nodes.

2. The media of claim 1, wherein the step group does not include a last step of the plurality of steps.

3. The media of claim 1, further storing instructions which cause:
  obtaining a second set of predicted idleness durations corresponding to the first plurality of nodes over a second time period;
  identifying a second target transaction associated with the second work group, the second target transaction comprising a second plurality of steps comprising a third step and a fourth step;
  wherein the fourth step is associated with a hard dependency on the third step such that an interruption of the target transaction after completion of the third step and before completion of the fourth step would require re-execution of the third step;
  obtaining a second set of predicted runtimes corresponding to the second plurality of steps of the second target transaction, wherein a second predicted idleness duration corresponds to the particular node;
  determining that the second predicted idleness duration of the particular node is greater than or equal to a second usage duration associated with a second step group;
  wherein the second step group consists of a subset of the second plurality of steps, and the second usage duration is determined based on a subset of the second set of predicted runtimes corresponding to the subset of the second plurality of steps;
  determining whether any step of the second step group is skippable in a resumption of the second target transaction in case a first execution of the second target transaction is interrupted subsequent to completion of the subset of the second plurality of steps but prior to completion of the second target transaction;
  responsive to determining that at least one step of the second step group is skippable:
    selecting the particular node for executing at least the second step group of the second target transaction.

4. The media of claim 1, wherein determining whether any step of the step group is skippable in a resumption of the target transaction in case a first execution of the target transaction is interrupted subsequent to completion of the subset of the plurality of steps but prior to completion of the target transaction is based on a set of hard dependencies between the plurality of steps identified from transaction information metadata.

5. The media of claim 1, wherein the step group consists of a maximum number of the plurality of steps where the usage duration remains smaller than the predicted idleness duration for the particular node.

6. The media of claim 1, wherein the usage duration associated with the step group is determined based on the subset of the set of the predicted runtime corresponding to the subset of the plurality of steps and a safety margin.

7. The media of claim 1, further storing instructions which cause:
  identifying the step group responsive at least to determining that none of the set of predicted idleness durations are greater than or equal to a second usage duration associated with the plurality of steps of the target transaction.

8. One or more non-transitory computer readable media storing instructions which, when executed by one or more hardware processors, cause:
  identifying a first plurality of nodes associated with a first work group of a plurality of work groups;
  wherein transactions associated with the first work group have priority over transactions associated with a second work group of the plurality of work groups to the first plurality of nodes, and transactions associated with the second work group have priority over transactions associated with the first work group to a second plurality of nodes associated with the second work group;
  obtaining a set of predicted idleness durations corresponding to the first plurality of nodes over a particular time period based at least on historical usage data of the first plurality of nodes over a historical time period;
  wherein a predicted idleness duration for a particular node of the first plurality of nodes corresponds to a time window during which the particular node is predicted to be associated with a node usage by the first work group that is below a threshold value, and the node usage by the first work group is determined based on one or more of a compute usage by the first work group and a memory usage by the first work group;
  identifying a target transaction associated with the second work group, the target transaction comprising a plurality of steps comprising a first step and a second step;
  wherein the second step is associated with a hard dependency on the first step such that an interruption of the target transaction after completion of the first step and before completion of the second step would require re-execution of the first step;
  obtaining a set of predicted runtimes corresponding to the plurality of steps of the target transaction based at least on historical runtimes for steps of transactions associated with a common set of characteristics as the target transaction;
  determining that the predicted idleness duration of the particular node of the first plurality of nodes is greater than or equal to a usage duration associated with a step group;
  wherein the step group consists of a subset of the plurality of steps, and the usage duration is determined based on a subset of the set of predicted runtimes corresponding to the subset of the plurality of steps;
  determining whether any step of the step group is skippable in a resumption of the target transaction in case a first execution of the target transaction is interrupted subsequent to completion of the subset of the plurality of steps but prior to completion of the target transaction, wherein determining that no steps of the step group is skippable comprises:
    identifying a hard dependency chain stemming from a particular step of the step group;
    determining whether the hard dependency chain reaches any step of the plurality of steps that is subsequent to the step group; and
    determining that the particular step is not skippable in response to determining that the hard dependency chain reaches a step of the plurality of steps that is subsequent to the step group;

responsive at least to determining that at least a particular step of the step group is skippable:
  selecting the particular node for executing the target transaction; and
  executing the target transaction on the particular node;
responsive at least to determining that no steps of the step group is skippable:
  refraining from selecting any of the plurality of nodes for executing the target transaction;
  determining that the target transaction cannot use any of the first plurality of nodes;
  assigning the target transaction to one or more of the second plurality of nodes; and
  executing the target transaction on the one or more of the second plurality of nodes.

9. The media of claim 8, further storing instructions which cause:
determining that execution of the target transaction on the particular node is interrupted subsequent to completion of the step group and prior to completion of the target transaction;
identifying a resumption set of steps, from the plurality of steps, that need to be executed, wherein the resumption set of steps comprises a first step of the step group from which a hard dependency chain stems and reaches a second step of the plurality of steps that is subsequent to the step group, and the resumption set of steps does not comprise the particular step that is skippable;
obtaining a second set of predicted idleness durations corresponding to the first plurality of nodes over a second time period, wherein a second predicted idleness duration corresponds to a second node of the first plurality of nodes;
obtaining a second set of predicted runtimes corresponding to the resumption set of steps;
determining that the second predicted idleness duration for the second node is greater than or equal to a second usage duration associated with a second step group;
  wherein the second step group consists of a subset of the resumption set of steps, and the second usage duration is determined based on a subset of the second set of predicted runtimes corresponding to the subset of the resumption set of steps;
determining whether any step of the second step group is skippable in another resumption of the target transaction in case a second execution of the target transaction is interrupted subsequent to completion of the subset of the resumption set of steps but prior to completion of the target transaction;
responsive at least to determining that at least one step of the second step group is skippable:
  selecting the second node for executing the resumption set of steps.

10. The media of claim 9, wherein the execution of the target transaction on the particular node is interrupted responsive to a request to execute a new transaction associated with the first work group.

11. The media of claim 9, further storing instructions comprising:
responsive to determining that a soft dependency chain stems from the particular step and reaches one or more steps of the plurality of steps that are subsequent to the step group:
  storing a state associated with completion of the particular step.

12. The media of claim 9, further storing instructions comprising: using a state associated with completion of the particular step as if the particular step is executed during execution of the resumption set of steps that does not include the particular step.

13. The media of claim 9, further storing instruction which cause: deploying a container associated with the target transaction onto the particular node.

14. The media of claim 9, further storing instruction which cause: executing the target transaction on the particular node.

15. A method comprising:
identifying a first plurality of nodes associated with a first work group of a plurality of work groups;
wherein transactions associated with the first work group have priority over transactions associated with a second work group of the plurality of work groups to the first plurality of nodes, and transactions associated with the second work group have priority over transactions associated with the first work group to a second plurality of nodes associated with the second work group;
obtaining a set of predicted idleness durations corresponding to the first plurality of nodes over a particular time period based at least on historical usage data of the first plurality of nodes over a historical time period;
wherein a predicted idleness duration for a particular node of the first plurality of nodes corresponds to a time window during which the particular node is predicted to be associated with a node usage by the first work group that is below a threshold value, and the node usage by the first work group is determined based on one or more of a compute usage by the first work group and a memory usage by the first work group;
identifying a target transaction associated with the second work group, the target transaction comprising a plurality of steps comprising a first step and a second step;
wherein the second step is associated with a hard dependency on the first step such that an interruption of the target transaction after completion of the first step and before completion of the second step would require re-execution of the first step;
obtaining a set of predicted runtimes corresponding to the plurality of steps of the target transaction based at least on historical runtimes for steps of transactions associated with a common set of characteristics as the target transaction;
determining that the predicted idleness duration of the particular node of the first plurality of nodes is greater than or equal to a usage duration associated with a step group;
wherein the step group consists of a subset of the plurality of steps, and the usage duration is determined based on a subset of the set of predicted runtimes corresponding to the subset of the plurality of steps;
determining whether any step of the step group is skippable in a resumption of the target transaction in case a first execution of the target transaction is interrupted subsequent to completion of the subset of the plurality of steps but prior to completion of the target transaction, wherein determining that no steps of the step group is skippable comprises:
  identifying a hard dependency chain stemming from a particular step of the step group;
  determining whether the hard dependency chain reaches any step of the plurality of steps that is subsequent to the step group; and
  determining that the particular step is not skippable in response to determining that the hard dependency chain reaches a step of the plurality of steps that is subsequent to the step group;
responsive at least to determining that at least a particular step of the step group is skippable:
selecting the particular node for executing the target transaction; and
executing the target transaction on the particular node;
responsive at least to determining that no steps of the step group is skippable:
refraining from selecting any of the plurality of nodes for executing the target transaction;
determining that the target transaction cannot use any of the first plurality of nodes;
assigning the target transaction to one or more of the second plurality of nodes; and
executing the target transaction on the one or more of the second plurality of nodes,
wherein the method is performed by one or more devices, each including at least one hardware processor.

16. The method of claim 15, wherein determining that the particular step of the step group is skippable comprises:
identifying a hard dependency chain stemming from the particular step of the step group;
determining whether the hard dependency chain reaches any step of the plurality of steps that is subsequent to the step group;
responsive to determining that the hard dependency chain does not reach any step of the plurality of steps that is subsequent to the step group:
determining that the particular step is skippable.

* * * * *